(12) United States Patent
Birkhold et al.

(10) Patent No.: US 12,458,448 B2
(45) Date of Patent: Nov. 4, 2025

(54) COMPUTER-IMPLEMENTED METHOD FOR EVALUATING IMAGE DATA OF A PATIENT, INTERVENTION ARRANGEMENT, COMPUTER PROGRAM, AND ELECTRONICALLY READABLE DATA CARRIER

(71) Applicant: Siemens Healthcare GmbH, Erlangen (DE)

(72) Inventors: Annette Birkhold, Stuttgart (DE); Christian Kaethner, Forchheim (DE); Sebastian Schäfer, Bayern (DE); Stephan Kellnberger, Erlangen (DE); Alois Regensburger, Poxdorf (DE)

(73) Assignee: Siemens Healthineers AG, Forchheim (DE)

( * ) Notice: Subject to any disclaimer, the term of this patent is extended or adjusted under 35 U.S.C. 154(b) by 396 days.

(21) Appl. No.: 17/954,944

(22) Filed: Sep. 28, 2022

(65) Prior Publication Data

US 2023/0123449 A1  Apr. 20, 2023

(30) Foreign Application Priority Data

Sep. 28, 2021 (DE) .................. 10 2021 210 860.1

(51) Int. Cl.
*A61B 34/20* (2016.01)
*A61B 17/12* (2006.01)
(Continued)

(52) U.S. Cl.
CPC ........ *A61B 34/20* (2016.02); *A61B 17/12181* (2013.01); *G06T 7/0016* (2013.01);
(Continued)

(58) Field of Classification Search
CPC .............. A61B 34/20; A61B 17/12181; A61B 2034/2065; A61B 2034/303;
(Continued)

(56) References Cited

U.S. PATENT DOCUMENTS 9,149,605 B2  10/2015  Kleinstreuer
9,993,303 B2   6/2018  Sankaran et al.
(Continued)

FOREIGN PATENT DOCUMENTS

DE  102010022926 A1  12/2011
DE  102016100713 A1   7/2017
DE  102020200750 A1   7/2021

OTHER PUBLICATIONS

Brown, Robert D., et al. "Frequency of intracranial hemorrhage as a presenting symptom and subtype analysis: a population-based study of intracranial vascular malformations in Olmsted County, Minnesota." Journal of neurosurgery 85.1 (1996): 29-32.
(Continued)

*Primary Examiner* — Syed Haider
(74) *Attorney, Agent, or Firm* — Lempia Summerfield Katz LLC

(57) ABSTRACT

A method for evaluating image data of a patient showing a target region to be treated with an embolizing agent includes providing a three-dimensional time-resolved image data set of a vascular system portion of the patient. A structural parameter that describes a geometry of at least the vascular system portion and/or a basic information item including dynamic parameters that describe hemodynamics in the vascular system portion is established from the image data set by an analysis algorithm. An embolization information item describing a plurality of embolizing agents that are to be used is provided. An actuation information item describing a suitable composition of the plurality of embolizing agents, for an intervention facility used for carrying out the
(Continued)

treatment is established by an establishing algorithm that uses the basic information item and the embolization information item, and the actuation information item is provided to the intervention facility.

16 Claims, 5 Drawing Sheets

(51) Int. Cl.
| | |
|---|---|
| *G06T 7/00* | (2017.01) |
| *G06T 7/60* | (2017.01) |
| *G16H 30/40* | (2018.01) |
| *G16H 50/50* | (2018.01) |
| *A61B 34/30* | (2016.01) |
| *A61B 90/00* | (2016.01) |

(52) U.S. Cl.
CPC ............... *G06T 7/60* (2013.01); *G16H 30/40* (2018.01); *G16H 50/50* (2018.01); *A61B 2034/2065* (2016.02); *A61B 2034/303* (2016.02); *A61B 2090/376* (2016.02); *G06T 2200/04* (2013.01); *G06T 2207/10121* (2013.01); *G06T 2207/30104* (2013.01)

(58) Field of Classification Search
CPC .. A61B 2090/376; G16H 50/50; G16H 30/40; G06T 7/0016; G06T 7/60; G06T 2200/04; G06T 2207/10121; G06T 2207/30104
See application file for complete search history.

(56) References Cited

U.S. PATENT DOCUMENTS

| | | | |
|---|---|---|---|
| 2005/0265923 A1* | 12/2005 | Toner | A61K 41/0038 424/1.11 |
| 2008/0102029 A1* | 5/2008 | Fritz | A61K 51/1244 424/9.1 |
| 2009/0198093 A1* | 8/2009 | Meissner | A61B 17/12186 601/3 |
| 2011/0301452 A1 | 12/2011 | Maschke et al. | |
| 2014/0276036 A1* | 9/2014 | Collins | A61B 5/746 600/431 |
| 2016/0148371 A1 | 5/2016 | Itu et al. | |
| 2016/0203288 A1 | 7/2016 | Meng et al. | |
| 2016/0314601 A1* | 10/2016 | Sankaran | G06T 7/0012 |
| 2017/0290544 A1 | 10/2017 | Yamamori et al. | |
| 2018/0035960 A1 | 2/2018 | Haase et al. | |
| 2018/0325479 A1 | 11/2018 | Flohr et al. | |
| 2019/0018149 A1 | 1/2019 | Traub et al. | |
| 2019/0159842 A1* | 5/2019 | Razeto | G06T 7/33 |
| 2021/0219850 A1 | 7/2021 | Birkhold | |

OTHER PUBLICATIONS

Graf, Carl J., George E. Perret, and James C. Torner. "Bleeding from cerebral arteriovenous malformations as part of their natural history." Journal of neurosurgery 58.3 (1983): 331-337.

Spetzler, Robert F., and Neil A. Martin. "A proposed grading system for arteriovenous malformations." Journal of neurosurgery 65.4 (1986): 476-483.

* cited by examiner

COMPUTER-IMPLEMENTED METHOD FOR EVALUATING IMAGE DATA OF A PATIENT, INTERVENTION ARRANGEMENT, COMPUTER PROGRAM, AND ELECTRONICALLY READABLE DATA CARRIER

This application claims the benefit of German Patent Application No. DE 10 2021 210 860.1, filed on Sep. 28, 2021, which is hereby incorporated by reference in its entirety.

BACKGROUND

The present embodiments relate to evaluating image data of a patient showing a target region to be treated with at least one embolizing agent in a vascular system portion of the patient.

Embolization is the artificial blockage of blood vessels of a patient (e.g., in a region to be treated). Herein, embolizing agents (e.g., embolisates) that are introduced by embolization instruments (e.g., microcatheters) into the vascular system of the patient are used. Typical embolizing agents include, for example, vascular adhesives (e.g., Onyx) and microspheres made of plastics. It is known therein to provide planning based on image data of a vascular system portion in which the region to be treated lies and/or likewise to undertake the intervention for introducing the embolizing agent with visual monitoring (e.g., fluoroscopic monitoring). For example, the embolization instruments may be introduced with imaging monitoring, and/or the embolization process may be visually monitored. Therein, the visual monitoring represents an integral component of the decision-making processes during such interventional medical procedures (e.g., for highly complex or time-critical cases). Embolization is a particularly challenging case of a minimally invasive intervention on a patient since the embolizing agent is to be introduced precisely in a specific region (e.g., a defined portion of the vascular system) in order to prevent further blood flow through the region to be treated.

Herein, different applications exist (e.g., different regions to be treated). A first example is the prevention of the blood supply to tumors, where it is known in this regard also to use embolizing agents that have a further-reaching therapeutic effect (e.g., emitting radiation). Another typical usage case is an abnormality and/or a malformation in the vascular system of the patient. Typical examples thereof are arteriovenous malformations (AVM) and dural arteriovenous fistulae (dAVF).

For embolizations in general, and for the special case of malformations in the vascular system of a patient, both the planning and also the minimally invasive intervention itself are extremely time-consuming since, for example, malformations may occur at varied locations and may have different sizes and complexities. The treatment options are also correspondingly complex since a complete elimination of the malformation is necessary in order to protect patients from future hemorrhages. The decision on whether a treatment should take place and, if a treatment is to be undertaken, how the treatment will be performed depends on the characteristics of the patient and the special properties of the malformations. These properties and characteristics are often brought together with evaluation systems that use the size, the location, and the venous flow pattern as the main factors for predicting the risk with regard to morbidity and mortality; see in this regard, for example, the article by R. F. Spetzler and N. A. Martin, "A proposed grading system for arteriovenous malformations," J Neurosurg, 1986: 65 (4): 476-83.

Apart from embolization, current treatment methods for malformations in the vascular system include conservative management, surgical removal, and stereostatic radiosurgery (SRS). Combinations of treatment possibilities are also conceivable (e.g., multimodal therapy). With regard to embolization, a further distinction is made between proximal embolization that occludes arteries, and distal embolization, where embolizing agent is introduced upstream into the at least one efferent vein. The standard technique for embolization that may also be used for tumors uses the transarterial approach in which a plurality of microcatheters is introduced as embolization instruments into the arterial feeder vessels (e.g., afferent vessels) and embolizing agent is fed through these microcatheters to the bloodstream. For example, four to five microcatheters may be utilized. This procedure is also designated "superselective catheterization". The main risk in any type of embolization is the bleeding that occurs when a portion of the shunts remain open and/or an overpressure arises, so that ruptures may occur.

The visual monitoring during an intervention in a target region to be treated (e.g., a tumor or a malformation in the vascular system) permits a medical practitioner performing the intervention to assess the status and/or progress of the intervention (e.g., the positioning of the embolization instruments and the embolization effect itself). The interventions are typically carried out manually, while the person carrying out the intervention is situated directly at the side of the operating table to be able to interact with the equipment being used. This equipment includes the imaging facility (e.g., the X-ray facility), the medical equipment, and/or instruments that are used during the intervention, and the system and/or the hand syringe via which the embolizing agent is administered.

In the prior art, applications have previously been proposed for assessing a target region to be treated within the vascular system, to undertake intervention planning, and to carry out a visual monitoring along the planned path, where the person carrying out the intervention is supported during the intervention. The intervention itself including the positioning of the embolization instruments and/or other instruments and the administration of the embolizing agent is carried out manually.

Apart from these approaches, solutions have already been made known that enable the person carrying out the intervention to steer medical apparatuses and/or instruments not manually but by a robotic system in order to enable a more controlled and precise positioning. A robotic system of this type, which may also be designated an intervention facility, may be used together with an imaging system (e.g., an X-ray facility) in order to permit visual monitoring and image-guided navigation during a robot-assisted procedure.

U.S. Pat. No. 9,149,605 B2 discloses a smart microcatheter system with an apparatus for controlled administration of particles and medicinal products into a blood vessel, where patient-specific computer simulations of the hemodynamics (e.g., in association with particles) are proposed. Specifically, in contrast to the known embolization approaches, it is proposed to utilize computational fluid-particle dynamics (CF-PD) analyses in order to create a correlation between the administration sites of embolizing agents and the accumulation of the embolizing agent downstream. This provides that targeted administration may be achieved in that the administration positions are skillfully selected. For this purpose, for example, a procedure referred to as "backtracking" is used in order, for a particular embolizing agent, to determine where the ideal administration positions are situated.

US 2017/0290544 A1 relates to a medical image diagnostic facility, where, from volume data of a target portion of a vessel network with a plurality of blood vessels that is connected to the vessel network, the vessel network and the blood vessels are extracted. An analysis function may carry out simulation analyses using computational fluid dynamics (CFD), where this takes place for different cases in which feeding-in blood vessels (e.g., "feeders" and/or afferent blood vessels) are embolized in a different sequence. The embolization sequence may be selected so that the risk for the patient is as small as possible.

SUMMARY AND DESCRIPTION

The scope of the present invention is defined solely by the appended claims and is not affected to any degree by the statements within this summary.

The present embodiments may obviate one or more of the drawbacks or limitations in the related art. For example, optimum preparation may be enabled, and the carrying out of an embolization of a patient may be enabled.

A computer-implemented method according to the present embodiments for evaluating image data of a patient showing a target region to be treated with at least one embolizing agent (e.g., a malformation that is to be treated) in a vascular system portion of the patient includes providing a three-dimensional time-resolved image data set of a vascular system portion. At least one structural parameter that describes the geometry of at least the vascular system portion and/or basic information item including dynamic parameters that describe the hemodynamics in the vascular system portion is established from the image data set by an analysis algorithm. An embolization information item describing a plurality of embolizing agents that are to be used is provided (e.g., microspheres of different diameters). An actuation information item describing a suitable composition of the plurality of embolizing agents for an intervention facility used for carrying out the treatment is established by an establishing algorithm that uses the basic information item and the embolization information item. The actuation information item is provided to the intervention facility.

Therein, the vascular system portion may include, for example, afferent and efferent blood vessels relative to the target region, and the target region. The method therefore relates to a particular procedure that is useful both in the context of planning and also in the context of execution, which will be considered in greater detail below, in that initially, the essential information for assessing the hemodynamics and possible embolization processes are extracted from the three-dimensional image data set in the form of the basic information item and is then used to establish an actuation information item for an intervention facility that may be used, for example, for carrying out the intervention for actuating the intervention facility. The actuation information item contains at least one suitable composition of the plurality of embolizing agents (e.g., including at least one mixture of at least part of the plurality of embolizing agents). In one embodiment, the actuation information may also be established describing instrument position of an outlet opening of at least one embolization instrument in the vascular system portion and/or a temporal sequence of the administration of the embolizing agent via the at least one embolization instrument. For example, the at least one embolization instrument (e.g., a microcatheter) may also form part of the intervention facility. It is therein usual to use a plurality of (e.g., four to six) microcatheters in order to be able to undertake the intervention superselectively, which the actuation information item can also at least partially describe. In principle, the present embodiments may relate to a case in which the embolization takes place from the venous side, although a performance for a transarterial access may be provided.

Therein, the present embodiments may be used advantageously for the case in which the plurality of embolizing agents include microspheres, and therefore embolisates that consist of small spheres that may have different diameters. In this regard, it has previously been known in the prior art to select the diameter of the microspheres such that a match to the at least one blood vessel to be embolized was created, so that only microspheres of particular selectable diameters were utilized. In the present embodiments, the degree of freedom of the miscibility of embolizing agents (e.g., microspheres of different diameters) is used. The actuation information item may advantageously describe a type of temporal administration profile that defines what composition of embolizing agents (e.g., mixtures of microspheres to be administered at which position (including, in the context of this description, the orientation)) in the vascular system portion at what time point in order to achieve an optimum overall treatment (e.g., with minimum risk to the patient and maximum occlusion). Therein, the fact is exploited that meanwhile intervention facilities have been proposed with which, controlled by an actuating mechanism, the administration of embolizing agents may be achieved highly precisely with regard both to quantity and also time point. For example, as described in detail below, an actuating mechanism (e.g., a robotic system) may be provided with regard to the placement of the embolization instruments, specifically their outlet openings. Due to the high level of complexity, the degree of freedom of a mixture and, for example, also the temporal sequence of a plurality of embolizing agents have previously been neither capable of planning nor implementation by a person performing the treatment, which are enabled for the first time by the present embodiments.

The procedure therefore permits a targeted embolization with the correct composition (e.g., mixture) of embolizing agents and, for example, also a suitable appropriate positioning of the corresponding embolization instruments. Finally, a type of "mix and match" approach for embolizing agents is provided (e.g., with regard to the distribution of sizes of microspheres as the embolizing agent). The method may derive an ideal composition for a given situation. Herein, different approaches for establishing the actuation information item may be provided, as discussed in more detail below. The actuation information item may then be used, for example, for actuating an intervention facility with a high precision actuator system that enables administration quantities in the milliliter or also the sub-milliliter range.

The planning and analysis provided according to the present embodiments are based upon at least one three-dimensional image data set of the vascular system portion. Therein, one or more of the at least one three-dimensional image data set may be recorded with an interventional X-ray facility, usable therefore in advance of and during the intervention (e.g., an X-ray facility with a C-arm on which an X-ray radiator and an X-ray detector are arranged). In one embodiment, the X-ray facility may also be used for, for example, fluoroscopic monitoring of a subsequent intervention in which the actuation information item is used for actuating the intervention facility. In general, it may be stated that one or more of the at least one three-dimensional image dataset may be an angiographic image data set recorded using a contrast medium. The temporal resolution is given, for example, based on the transport of the contrast medium bolus.

Generally speaking, however, the planning may also be based upon other types of pre-interventional imaging so that one or more of the at least one three-dimensional image data set may also be a computed tomography image data set, a magnetic resonance image data set, a PET image data set, an ultrasonic image data set, and/or an image data set from another modality. If an interventional X-ray facility is used, the analysis and establishing may suitably take place in a control facility of the X-ray facility, although other computing facilities (e.g., a planning facility) may also be used.

Using an analysis algorithm, using the at least one three-dimensional, time-resolved image data set, structural parameters that describe the geometry of at least the vascular system portion and/or dynamic parameters that describe the hemodynamics in the vascular system portion are established. These form a basic information item for the subsequent use of the establishing algorithm for the actuation information item. For example, the analysis algorithm may establish a patient surrogate model of the vascular system portion that, for example, may underlie a simulation. In order to establish structural parameters and dynamic parameters, in the prior art, different approaches are known that are also usable in the context of the present embodiments. For example, for establishing the structural parameters, a segmentation of the vascular system portion may take place, to which a model based, for example, upon meshes is adapted. For example, for establishing the basic information item, reference is made to US 2021/0219850 A1. Therein, a segmentation of a vascular malformation of the at least one afferent blood vessel and the at least one efferent blood vessel is first undertaken in order then to determine average blood flow velocity parameters for the blood vessels, from which further conclusions may then be drawn, for example, regarding a three-dimensional pressure distribution, the porosity, and/or the permeability of the malformation and suchlike. Herein, artificial intelligence may also be used. Other approaches as described for establishing the basic information item are, however, conceivable, which, as mentioned, may include the three-dimensional geometry of the vascular system portion (e.g., in the form of a mesh model, hemodynamic parameters, and/or properties of the region to be treated, such as its porosity and/or permeability).

In an embodiment, the analysis algorithm may include at least one trained analysis function as is also described, for example, in US 2021/0219850 A1. The use of artificial intelligence has the advantage of being able to provide basic information item (e.g., structural parameters and/or dynamic parameters) in real time, and of using the available correlations as extensively as possible.

In general, a trained function reproduces cognitive functions which humans associate with other human brains. By way of training based upon training data (e.g., machine learning), the trained function is able to adapt itself to new circumstances and to detect and extrapolate patterns.

In general, parameters of a trained function may be adapted by training. For example, supervised learning, semi-supervised learning, unsupervised learning, reinforcement learning, and/or active learning may be used. In addition, representation learning (also known as "feature learning") may be used. For example, the parameters of the trained functions may be adapted, for example, iteratively by way of a plurality of training steps.

A trained function may include, for example, a neural network, a support vector machine (SVM), a decision tree, and/or a Bayesian network, and/or the trained function may be based upon k-means clustering, Q-learning, genetic algorithms, and/or assignment rules. For example, a neural network may be a deep neural network, a convolutional neural network (CNN), or a deep CNN. Further, the neural network may be an adversarial network, a deep adversarial network, and/or a generative adversarial network (GAN).

The basic information item forms the basis for establishing the actuation information item by the establishing algorithm. The actuation information item may contain at least all the necessary information for the administration of embolizing agents (e.g., the positions, also including the orientations, of the outlet openings of the embolization instruments and a temporal sequence that indicates during which time periods what quantity of embolizing agents are to be output in which composition via which embolization instrument). Herein, for example, changeable positions may be provided, including in the context of the temporal sequence. In a suitable development of the present embodiments, the actuation information item may be established, also including an intervention path for each embolization instrument used. In this context, it is suitable if one or more of the at least one three-dimensional image data set then shows an access site in the vascular system of the patient. The establishing algorithm may thus be used to describe the intervention path along which the embolization instrument is moved through the vascular system to its position. For this purpose, the basic information item may, for example, also include properties of further blood vessels beyond the vascular system portion (e.g., the diameter and/or the thickness of the vessel walls). It is, however, also conceivable to plan the intervention paths at least partially manually. It may, however, be suitable to hold it in reserve in the actuation information item (e.g., when, as will be described in greater detail, a visual monitoring of the intervention is to take place such as by the X-ray facility).

In an embodiment, the establishing algorithm includes the execution of a simulation of the hemodynamics based on the basic information item, and/or the establishing algorithm includes a function trained by training data derived from such a simulation. Although in an alternative embodiment, a lookup table may be used in the context of the establishing algorithm, it has proved to be more favorable to access a simulation of the hemodynamics and/or a trained function that was trained based on such a simulation in order to cover as far as possible all the conceivable cases and therefore all the types of target regions that are to be treated. Specifically, the simulation may be carried out as a computational fluid dynamics (CFD) simulation and/or in the case of microspheres as the embolizing agent, as a computational fluid-particle dynamics (CF-PD) simulation. Such approaches are in principle already known from the prior art and may also be used in the context of the present embodiments. Therein, the basic information item contains, in the form of the structural parameters defining the geometry of the vascular system portion, and in the form of the dynamics parameters describing the hemodynamics, all the available knowledge in order to provide the starting conditions and the boundary conditions for a simulation, including with the addition of embolizing agents. For example, a patient surrogate model of the vascular system portion proves to be a suitable basis for preparing and carrying out the simulation regarding the vascular system portion.

Such an approach based upon simulations ultimately permits the prediction of the distribution and accumulation of embolizing agents, whereas the embolization treatment of target regions that are more complex to treat (e.g., vascular malformations) may be based on a time-resolved three-dimensional image recording, where a patient-specific patient surrogate model of the vascular system portion is derived. Therein, as considered in more detail below, alongside the embolizing agent effect and/or the embolizing agent distribution, the simulation may also output hemodynamics parameters (e.g., flow parameters and/or pressure changes and/or a time-resolved pressure distribution in relevant vessel structures). Therein, in the case of liquid embolizing agents such as vascular adhesives, multiphase mixture continuum mechanics modelling may be utilized, extended in the case of microspheres as the embolizing agent for the inclusion of particles/solid bodies.

If a trained function is used in this context, it may be provided to train the trained function (e.g., including a CNN) with simulated embolization processes. A patient surrogate model present, for example, as part of the basic information item is used. Therein, as already stated, geometric conditions and boundary and/or starting conditions relating to the blood flow may be derived from the at least one three-dimensional image data set, where in addition, corresponding positions of the outlet openings of embolization instruments and/or temporal sequences with allocated compositions of embolizing agents (e.g., in the manner of a training embolization configuration that is to be checked) may be accessed in order to calculate the embolization effect using the simulation. This embolization effect is then described via the output data of the trained function, which includes, for example, a three-dimensional distribution of the embolizing agent over time and/or a three-dimensional pressure distribution within the vascular system portion for the predetermined embolization configuration. The output data of a subalgorithm of this type may therefore be made the basis of an optimization in order to select a test embolization configuration for which the optimal embolization effect has been ascertained based on the output data, as the basis of the actuation information item.

In one embodiment, the trained function may be applied directly to three-dimensional time-resolved image data of the three-dimensional image data set (e.g., restricted to the vascular system portion). Then, a plurality of further, not necessarily essential input data is accessed for the trained function. In such a case, the basic information item may therefore include image data of the three-dimensional time-resolved image data set. However, in preparation, by way of the analysis algorithm, the essential information may be extracted as input data for the trained function and thus, for example, to form the patient surrogate model from the structural parameters and possibly at least partially from the dynamic parameters.

The use of a trained function that has been trained based on simulations and thus ultimately replaces the execution of the simulation itself permits a significantly more rapid access, able to be realized in real time, to the output data, although still with high quality and robustness.

Overall, this simulation-based approach permits a precise planning of an embolization intervention, since the simulation-based approach permits a prediction of which test configuration (e.g., including positions of embolization instruments, compositions of embolizing agents to be used, and an associated temporal sequence) permits an optimal, complete embolization of the target region that is to be treated. This includes, as described, for example, the composition of the embolizing agent and the inflow profile of the embolizing agent over time. As described below, this approach permits (e.g., with later further use of the output data for the embolization configuration described by way of the actuation information item) a real-time monitoring based on fluoroscopy images (e.g., also a corresponding adaptation of the sequence of the embolization intervention).

In an exemplary embodiment, for the training phase of the trained function, when a machine learning approach is used, it may be provided, after providing at least one three-dimensional time-resolved image data set (e.g., a four-dimensional digital subtraction angiography (4D-DSA)), to establish a patient surrogate model using the analysis algorithm. The patient surrogate model may be described via structural parameters and dynamic parameters as, and/or as part of, the information. The physics is also provided via a physics model (e.g., a CFD model and/or a CF-PD model). Examples of such physics models are three-dimensional multiphase mixture continuum models that may include, for example, a fluid structure interaction model and/or a homogenizing continuum model. Based on this, for example, a CFD or CF-PD simulation that may be carried out based on a test configuration, as described, is now possible. The CFD or CF-PD simulation, therefore, for example, contains positions of embolization instruments, compositions of embolizing agents to be used, and allocated temporal sequences. Training output data may be obtained for each such training configuration (e.g., including a three-dimensional distribution of the embolizing agent over the time and a pressure distribution within the vascular system portion).

Therefore, training data sets including input data (e.g., the utilized portion of the basic information item) and output data are present. The training data sets are used in order to train the function that is provided accordingly. For example, the function to be trained may relate to a CNN (e.g., as an encoder-decoder network). Apart from the basic information item, the training input data also includes the training configuration for the embolization intervention.

Such a trained function may be used, for example, as and/or as part of, a subalgorithm of the establishing algorithm, even in an at least partially user-controlled process for establishing the actuation information item. In this regard, the user himself may select, for example, instrument positions of embolization instruments, exactly like compositions of embolizing agents and/or temporal sequences in order to "try out" these test configurations and to assess the embolization effect, in order ultimately himself to select the most suitable embolization configuration underlying the actuation information item. However, an optimization method, as will now be described, may be used. There also, as in all the acts of the method according to the present embodiments, an intervention possibility for correction/adaptation may be offered to a user.

A development of the present embodiments therefore provides that the establishing of the actuation information item includes an optimization method relating to at least the composition (e.g., also relating to the instrument positions and/or the temporal sequence). A subalgorithm including, for example, the simulation and/or the trained function establishes an effect information item to be optimized that describes the embolization effect using a test configuration of the actuation information item. The effect information item thus corresponds, when the trained function is used, for example, to at least one portion of the output data. The idea here is that of using the subalgorithm (e.g., the simulation and/or the function trained based on the simulation) in order to select from test configurations in the most targeted possible manner an embolization configuration providing an optimal effect to be based upon the actuation information item. Herein, optimization approaches known in principle from the prior art may also be used in the context of the present embodiments in order to find a sufficiently optimal solution as quickly as possible. The effect information item is optimized dependent upon at least the composition of the embolizing agents, where the optimization also relates to the instrument positions and the temporal sequence. Optimization criteria may include a most extensive possible embolization of the subregion to be treated, the shortest possible duration of the embolization intervention, the lowest possible pressure loading and therefore the lowest possible hemorrhage and rupture risk, and/or the minimum necessary quantity of embolizing agents. Therein, corresponding weightings may also be undertaken.

With regard to the risk to the patient, however, it may be provided that the optimization method uses at least one boundary condition relating to patient safety. Specifically, this may provide that the local pressure in the vessel structures is kept below a predetermined maximum. For this purpose, in a specific development of the present embodiments, it may be provided that the effect information item including a pressure distribution is established in the vascular system portion. A predetermined maximum pressure as a boundary condition in the optimization method is not be exceeded. In this way, the rupture risk and, for example, the hemorrhage risk to patients may be kept as low as possible.

As previously mentioned, a development of the present embodiments may also provide that during the intervention (e.g., by the aforementioned interventional X-ray facility), two-dimensional fluoroscopy images of the vascular system portion are recorded, and the fluoroscopy images are evaluated for monitoring the positioning of the at least one embolization instrument and/or the embolization effect. For example, given a deviation from a planning information item including, for example, the actuation information item, the intervention facility may be actuated for the at least partially automatic, at least partial correction of the deviation so that finally a closed control loop is realized. Therein, the actuation information item may also contain, for example, output data of the trained function and/or simulation results of the simulation for the embolization configuration described by the actuation information item. Then, the actual sequence may be compared with this component of the actuation information item based on the fluoroscopy images. In the event of deviations from the predicted embolization effect, ultimately the effect information item for the embolization configuration, an updating, for example, of the actuation information item may take place in order to compensate for the deviation. In other words, an intervention monitoring of the embolization intervention and a real-time updating are enabled, where the fluoroscopy images may, for example, be evaluated in order to update the basic information item (e.g., the patient surrogate model) and to update the embolization configuration using the subalgorithm.

Specifically, in the context of the method according to the present embodiments, it may be provided, for example, that after establishing the actuation information item, at least one current fluoroscopy image of the vascular system portion is provided. The fluoroscopy image may be evaluated for an updating of the basic information item, after which, based on the updated basic information item, an updated actuation information item is established (e.g., using the establishing algorithm). Therein, for example, at least the embolization instruments and/or the embolizing agent and/or the blood flow in the fluoroscopy images may be visible. In order to make the blood flow visible in fluoroscopy images, a suitable embodiment may provide that the fluoroscopy images are recorded as a time series after administration of a contrast medium. If, therefore, the fluoroscopy images also supply no complete three-dimensional information in order to establish a sufficiently correct patient surrogate model, it has been recognized according to the present embodiments that it is sufficient to ascertain changes that have occurred (e.g., the previous occurrence of at least partial occlusion of blood vessels and/or vessel structures in the vascular system portion, other changes to the flow pattern and/or also undesirable changes of instrument positions and suchlike). In this regard, it is possible, for example, while using the embolization instruments, to aim for a contrast medium administration intermittently between the administration of embolizing agents in order to image the blood flow. In one embodiment, the embolizing agents may themselves be visible in the fluoroscopy images so that their spread and accumulation, and therefore the embolization effect itself, may also be directly visible. As previously indicated, this is advantageous if, for example, as part of the actuation information item, a prediction has already been made (e.g., as effect information of the subalgorithm for the embolization configuration), which may be checked.

Therefore, a development of the present embodiments provides that in a prediction procedure (e.g., using the establishing algorithm, specifically the subalgorithm and/or as part of the actuation information item), a prediction information item describing the effect situation in the vascular system portion (e.g., as the effect information item of the embolization configuration) is established. The predication information item is compared with the actual effect situation described by the current fluoroscopy image. In the event of a deviation information item meeting an updating criterion, an establishment of the updated actuation information item takes place. In this event, monitoring is therefore undertaken as to whether a prediction already made is actually correct or whether a modification, effectively real-time tracking, of the actuation information item is to be provided. In this context, a trained function as part of the establishing algorithm (e.g., the subalgorithm) proves to be advantageous based on the real-time capability of artificial intelligence.

The prediction information item does not necessarily have to be the effect information item of the subalgorithm, but may also arise differently in the context of the establishing algorithm. For example, also, independently of the approach according to the present embodiments of also optimizing the composition of embolizing agents (e.g., to permit mixtures) and to implement them by way, for example, of automatic actuation, in the spirit of this concept, approaches for real-time monitoring and possible adaptation of the embolization effect during the execution of the intervention may be provided. Herein, the prediction information item may generally be provided in the context of the planning, whether manual, semi-automatic, or entirely automatic, in a manner that describes the expected temporal distribution of embolizing agents in the vascular system portion. The actual embolization effect may be ascertained based on the fluoroscopy images recorded during monitoring and compared with the prediction information item, specifically, therefore, the expected embolization effect. On ascertaining a deviation (e.g., the fulfilment of the updating criterion), in this context, the establishing algorithm may also be used with an updated basic information item, in order (e.g., in real time) to achieve an adaptation to the changed circumstances. Herein, the basic information item, as also in the method according to the present embodiments, is provided by the analysis algorithm, however, is not necessarily made use of during the planning establishment of the actuation information item, but rather is first used in the context of these real-time interventions.

In the context of the present embodiments, an X-ray facility having a control facility configured for carrying out a method according to the present embodiments may also be provided. This may be, for example, an interventional X-ray facility with which, for example, before the start of the intervention, the three-dimensional time-resolved image data set that may be automatically analyzed and further evaluated directly by the X-ray facility is recorded in order to ascertain the actuation information item. Further, the X-ray facility may also be used to carry out fluoroscopic monitoring.

The present embodiments also relate, apart from the method, to an intervention arrangement for carrying out an embolization intervention with at least one embolizing agent in a target region to be treated (e.g., an abnormality or a malformation that is to be treated) in a vascular system portion of the patient. The intervention arrangement includes an interventional X-ray facility having, for example, a C-arm on which an X-ray radiator and an X-ray detector are arranged opposite one another. The intervention arrangement also includes an intervention facility having, for example, embolization instruments that may be positioned at least partially robotically in the vascular system portion (e.g., microcatheters), and an embolizing agent output apparatus that may be connected to the embolization instruments for outputting at least one embolizing agent via the connected embolization instrument. The intervention arrangement also includes a control arrangement including a control facility of the X-ray facility and a control facility of the intervention facility. The control facilities are connected via a communication link. The control arrangement is configured to carry out a method according to the present embodiments and to actuate the intervention facility according to the actuation information item.

All descriptions regarding the method according to the present embodiments apply similarly to the intervention arrangement according to the present embodiments, so that the aforementioned advantages may therefore also be achieved therewith.

The control arrangement may also contain at least one further control and/or computing facility that may carry out acts and/or subacts of the method according to the present embodiments and/or others of the control technology measures also mentioned in the following. In each case, the control facilities and/or, if available, the computing facility each have at least one processor and at least one storage device. The control facility of the X-ray facility may therein have, as is known in principle, a recording unit for actuating the X-ray facility for recording image data. At least one of the at least one three-dimensional time-resolved image data set may be recorded with the X-ray facility (e.g., by way of corresponding actuation by the recording unit), although one or more of the at least one three-dimensional time-resolved image data set may, however, be provided via an external interface (e.g., as a computed tomography image data set, as a magnetic resonance image data set, as an ultrasonic image data set, as a PET image data set, and suchlike). The control facility of the X-ray facility may further include a reconstruction unit that may be configured to establish three-dimensional image data sets of a recording region from two-dimensional projection images. For example, the reconstruction unit may therefore also be configured to establish the one or more of the at least one three-dimensional time-resolved image data set that is recorded with the X-ray facility, and to provide the one or more three-dimensional time-resolved image data sets via an interface internal to the control arrangement.

The control arrangement includes an analysis unit for carrying out the analysis algorithm and an establishing unit for carrying out the establishing algorithm. The control arrangement also includes a second interface that is internal to the control arrangement. The second interface is to a control unit of the control facility of the intervention facility, which uses the established actuation information item in order to actuate the intervention facility according to the actuation information item, and therefore, for administering the established composition of embolizing agents (e.g., also for implementing the instrument positions and/or the temporal sequence). The analysis unit and the establishing unit may both be part of one of the control facilities and/or of a separate computing facility.

In this way, an overall system for assisted and image-guided embolization of a target region to be treated is provided, which provides, for example, a closed-loop communication and closed-loop control between all the subsystems and therefore, for example, the X-ray facility and the intervention facility. The overall system enables a targeted embolization with the correct mixture of embolizing agents (e.g., also the correct, robot-assisted positioning of the embolization instruments and the automated implementation of the temporal sequence). Thereby, an improved support of a person carrying out the intervention is enabled, and a more precise procedure is permitted. In addition, as described in greater detail below, an improved monitoring and evaluation of the influence of the blood flow in the vascular system portion as a function of the administered embolizing agent is enabled.

An important element is the embolizing agent output apparatus that may be actuated via the control facility in accordance with the actuation information item, in order to realize as exactly as possible the composition established and provided in the planning by the method according to the present embodiments (e.g., in its temporal sequence). Therein, it may be specifically provided that the embolizing agent output apparatus has an accuracy in the output of embolizing agent of less than one milliliter and/or a plug-in module system for a plurality of plug-in modules that each contain an embolizing agent. For example, the embolizing agent output apparatus may include a plug-in module holding system or "cartridge holding system" in which plug-in modules (e.g., cartridges such as microsphere syringes and/or syringes for liquid embolizing agent) may be held. Embolizing agent output apparatuses of this type may further have, for example, at least one mixing chamber in which mixtures of embolizing agents may be prepared and may be fed to at least one of the at least one embolization instrument. Therein, both a parallel and also a serial mixing may be provided. Such administering apparatuses that permit compositions of agents from different plug-in modules (e.g., cartridges), for example, in mixing chambers, have previously been proposed for other application fields and may also be used in the context of the present embodiments, attached to a robotic positioning system for the embolization instrument. In one embodiment, in the case of using microspheres as the embolizing agent, plug-in modules that contain microspheres of different diameters may be used. Based on the previously determined actuation information item, a mixing and patient-specific adaptation of the sphere size distribution may therefore be undertaken in order to enable an ideal composition (e.g., also with regard to the temporal sequence). In order to implement the automatic actuation, the embolizing agent output apparatus may include, for example, the plug-in module system, a high-precision actuator system that enables administration quantities and/or highly precise mixtures of milliliter accuracy or even sub-milliliter accuracy. Herein, for example, each plug-in module may be allocated to an actuator via which highly precise quantities of the respective embolizing agent may be introduced into at least one mixing chamber of the embolizing agent output apparatus. Actuators may also be allocated to the mixing chamber in order to be able to pass on highly precise quantities to the embolization instruments.

The intervention facility may also have at least one further intervention element (e.g., a preparation catheter and/or further medical apparatuses used in the context of the intervention). In other words, it is therefore possible, for example, also to accommodate preparation catheters or suchlike into the overall control system and also monitoring (e.g., also to place them robotically and/or to introduce active agents via these into the vascular system portion). A plug-in module system may also enable, apart from embolizing agents, other active agents to be introduced via embolization instruments (e.g., microcatheters) into the vascular system portion (e.g., medicinal products and/or contrast media). Such further active agents may also be output via other medical instruments (e.g., preparation catheters).

The plug-in modules may therefore include, particularly in the case of a vascular adhesive and/or another liquid embolizing agent, but also in the case of microspheres, syringes able to be connected to at least one of the embolization instruments, and/or other cartridges. Each of the syringes may suitably be allocated an actuator.

In one embodiment, it may be provided that the intervention facility has a robotic positioning facility for positioning embolization instruments that are to be used. Given an actuation information item including additionally at least one instrument position of an outlet opening of at least one embolization instrument in the vascular system portion, the control facility of the intervention facility is configured for actuating the positioning facility for the assumption by at least one of the embolization instruments of the at least one instrument position. As mentioned above, in the context of the present embodiments, positioning facilities for embolization instruments (e.g., microcatheters) that are suitable at least for fine positioning and have already been described in the prior art may be utilized in order to further improve the precision of the embolization intervention and also lessening the responsibility on a person carrying out the intervention.

Therewith, the present embodiments therefore propose not only creating a closed-loop control system between the X-ray facility (e.g., imaging during the intervention) and the positioning facility (e.g., for controlling the medical apparatuses and instruments), but also integrating the embolizing agent output apparatus in order thus, through the actuation thereof taking place according to the actuation information item (e.g., fully automatically), for patient-specific embolization procedures to introduce suitable compositions of embolizing agents optimally (e.g., according to an equally optimally selected temporal sequence). This is advantageous with regard, for example, to the monitoring of the intervention, as described in detail below, permitted based on the interventional X-ray facility since not only may the positioning facility be informed with regard to the control of the embolization instruments and possibly of further instruments by way of imaging, and carry out the relevant measures, but the mixing and application of the corresponding embolizing agents may also be bound into the image-based guidance and regulation.

In an embodiment, the control arrangement may be configured for actuating the X-ray facility for recording two-dimensional fluoroscopy images of the vascular system portion and for evaluating the fluoroscopy images for monitoring the positioning of the at least one embolization instrument and/or the embolization effect. For this purpose, the control arrangement may include a corresponding monitoring unit implementing these measures, where the actuation for recording the two-dimensional fluoroscopy images may take place via the recording unit of the control facility of the X-ray facility. For example, for implementing the described closed control loop, it may be provided that the control arrangement is configured, given a deviation from a planning information item including, for example, the actuation information item, for actuating the intervention facility for at least partially automatic, at least partial correction of the deviation.

Using a planning information item that is, for example, grouped together in the actuation information item that may also contain an (e.g., expected) effect information item, the at least partially automated embolization procedure is carried out on the subregion to be treated. In parallel, the use of a monitoring unit based on the already described closed control loop of the involved facilities is provided, which may first relate to the targeted placement of instruments (e.g., embolization instruments) using the X-ray facility and the positioning facility. The use of the monitoring unit may also relate to the monitoring of the embolization effect and the measures resulting therefrom using the X-ray facility and the embolizing agent output apparatus. Expressed differently, this embodiment may enable an adaptation of the positioning and the embolization flow by the positioning facility and the embolizing agent output apparatus supported via fluoroscopy. Thus, an application of the embolizing agent may be carried out tailored to the actual position of the embolization instrument and the size, etc. of the blood vessels at the target location. Further, a precise, at least partially automated new adaptation based on the information obtained via the fluoroscopy images is possible.

In an embodiment of the intervention arrangement, it may be provided that the control arrangement is configured for establishing a prediction information item describing the effect situation in the vascular system portion in a prediction procedure (e.g., using the establishing algorithm) and/or as part of the actuation information item. The control arrangement is configured for comparing the prediction information item with the actual effect situation described via a current fluoroscopy image and if a deviation information item from the comparison for establishing an updated actuation information item fulfills an updating criterion. Therein, as already described, the establishing algorithm may have a subalgorithm for establishing the effect information item in an optimization method, as described in relation to the method according to the present embodiments, so that then the effect information item (e.g., including a time-resolved distribution of administered embolizing agent) and a pressure distribution may be used for the embolization configuration selected from the test configurations for the actuation information item as a prediction information item. For example, the simulation and/or the trained function form part of the subalgorithm. As previously explained in relation to the method, in the event of a deviation information item fulfilling an updating criterion, on comparison, an establishment of an updated actuation information item based on the establishing algorithm may take place, where the basic information item may be adapted based on the information from the at least one two-dimensional fluoroscopy image. If an optimization method is used, the previous actuation information item may be used as the starting point for the finding the new optimum for an embolization configuration. In general, for the intervention arrangement, the control arrangement for updating the actuation information item by way of evaluating the fluoroscopy image may be developed for an updating of the basic information item and for establishing the updated actuation information item based on the updated basic information item.

In a recording (e.g., a high-frequency recording) of fluoroscopy images made in the manner of a video, a time series of fluoroscopy images may also be evaluated for monitoring, and/or just a portion of the fluoroscopy images may be evaluated for the monitoring (e.g., every seventh to fifteenth image; every tenth image).

In a development, the control arrangement may be configured, for the monitoring, for using at least one patient-related additional information item of at least one measuring facility of the intervention arrangement. In this case, the intervention arrangement therefore also includes at least one measuring facility, for example, as part of the intervention facility. For example, one or more of the at least one measuring facility may be an ECG measuring facility that may supply a heart frequency or suchlike. In one embodiment, it may, however, be provided that one or more of the at least one measuring facility is a flow sensor and/or an imaging sensor (e.g., an OCT facility and/or an IVUS facility) on at least one embolization instrument that is used. This provides that embolization instruments (e.g., microcatheters) may be equipped with a flow sensor that may supply a blood flow information item that is useful for the evaluation and, for example, also updating of the basic information item with high accuracy. Additionally or alternatively, embolization instruments may also provide a further imaging modality and may therefore include an imaging sensor (e.g., for Doppler-OCT (optical coherence tomography) or IVUS (intravascular ultrasound)). Therein, the flow sensor may also measure an embolizing agent flow. Via such additional equipment of embolization instruments, an improved monitoring and dynamic adaptation of the administration flow of the embolizing agent may take place. This may be combined with the previously described visual monitoring and, for example, also the positioning by the positioning facility. Stated differently, it may be provided that the control arrangement for evaluating the additional information of the flow sensor and/or of the imaging sensor is configured for monitoring the introduction of embolizing agent. It may be provided that the control arrangement for establishing a flow information item (e.g., blood flow information) is formed from the additional information items from the flow sensor and/or the imaging sensor and, for example, for updating the dynamic parameters of the basic information item and/or the actuation information item based on the flow information.

In general, the fluoroscopy monitoring and, for example, other monitoring (e.g., using additional information may enable adaptation of the administration and composition (e.g., the mixing) of the embolizing agents dynamically to the actual effect situation (e.g., the blood flow). For example, in this context, it may be provided that the control arrangement is configured for using microspheres of smaller diameter for slower blood flow and of larger diameter for faster throughflow.

In this context, for the intervention arrangement, it applies ultimately that, for example, this aspect of the dynamic tracking of the embolization composition and ideally also the instrument positions and the temporal sequence may also be carried out independently of an establishment of the actuation information item using the establishing algorithm in the planning phase. This provides that an intervention arrangement for carrying out an embolization intervention with at least one embolizing agent in a target region (e.g., a malformation that is to be treated) in a vascular system portion of the patient may be provided. The intervention arrangement includes an interventional X-ray facility, and an intervention facility having embolization instruments that may be positioned in the vascular system portion and an embolizing agent output apparatus that may be connected to the embolization instruments for outputting at least one embolizing agent via the connected embolization instrument. The intervention arrangement also includes a control arrangement including a control facility of the X-ray facility and a control facility of the intervention facility. The control facilities are connected via a communication connection. The control arrangement is configured to carry out the following acts: providing at least one three-dimensional time-resolved image data set of the vascular system portion; establishing at least one structural parameter that describes the geometry of at least the vascular system portion and/or basic information item including dynamic parameters that describe the hemodynamics in the vascular system portion from the image data set by way of an analysis algorithm; providing an actuation information item for the intervention facility as part of a planning information item from a planning procedure; and actuating the intervention facility based on the actuation information item. The control arrangement is configured for actuating the X-ray facility for recording two-dimensional fluoroscopy images of the vascular system portion during the execution of the intervention and for evaluating the fluoroscopy images for monitoring the positioning of the at least one embolization instrument and/or the embolization effect. The control arrangement is configured, given a deviation from a planning information item including, for example, the actuation information item for actuating the intervention facility for at least partially automatic, at least partial correction of the deviation. The correction concerns at least partially a use of a composition of a plurality of embolizing agents and is implemented via actuating the embolizing agent output apparatus. The corresponding embodiments for dynamic monitoring and tracking of these closed control loops may also be applied for this conceivable intervention arrangement.

In a development, it may further be provided that the intervention facility or the X-ray facility also has a contrast medium administration facility. The control arrangement for actuating the contrast medium administration facility dependent upon an embolizing agent feed by the intervention facility is configured such that on administration of an X-ray visible embolizing agent, a reduced or no contrast medium quantity is present in the vascular system portion. This may be a type of smart layering of the contrast in order to derive a better understanding from the fluoroscopy images of the transport behavior of the embolizing agent. Therefore, when contrast medium is used, general hemodynamic properties may be analyzed, for example, for updating the dynamic parameters, by imaging the embolizing agent spread. An information item relating thereto may be obtained that may be compared, for example, with a time-resolved embolizing agent distribution of a prediction information item. Stated differently, it may be provided that the control arrangement is configured to establish, from a sequence of fluoroscopy images recorded during an embolizing agent administration, an embolizing agent transport information item and to take it into account in the actuation of the intervention facility (e.g., for updating a temporal sequence of the actuation information item). A part of this smart layering approach may realize different image-based time delays (e.g., with different microspheres at different times and even with different instrument positions) in order to increase the precision further.

By grouping together different components of the visual monitoring, as described above, a more careful and more detailed embolization of the target region to be treated may take place since it is also enabled with different measures as described to identify small residual blood flows and to take suitable measures to complete the embolization. For example, the intervention arrangement according to the present embodiments may thus also be used in emergency procedures or in the case of undesirable injury events and/or may lead to a successful conclusion.

According to the present embodiments, the intervention arrangement may further have an operating facility with a display facility and an input facility. Using a display facility on which essential information and/or image data (e.g., at least the actuation information item and the fluoroscopy images) may be reproduced during the monitoring, it is possible for a human operating person (e.g., the person carrying out and monitoring the intervention) to track everything without difficulty. Therein, using the input facility, the operating facility permits an intervention at any time and therefore an influence to be exerted (e.g., by a medical practitioner). In exemplary embodiments, the present embodiments may also provide for particular information and data (e.g., the actuation information items actually to be used only after confirmation by a user). This may also apply, for example, for the basic information item that, for example, may still be adapted/corrected by a user in order to enable a further improvement. In other words, the intervention arrangement according to the present embodiments may be configured overall so that users have the possibility at any time for intervening and exerting influence.

A computer program according to the present embodiments may be directly loaded into the memory store of a computing facility (e.g., a control arrangement of an intervention arrangement), and has program means in order to carry out the acts of a method according to the present embodiments when the computer program is executed in the computing facility, for example, of the control arrangement. For example, the computer program may also have program means configured for implementing acts executable by the control arrangement of an intervention arrangement according to the present embodiments, as described in the description, for example. Therefore, not only the statements made in relation to the method, but also in relation to the intervention arrangement also apply accordingly for the computer program. The computer program may be stored on an electronically readable data carrier (e.g., a non-transitory computer-readable storage medium) according to the present embodiments, which therefore includes control information that includes a computer program according to the present embodiments and is configured such that, on use of the data carrier in a computing facility (e.g., of a control arrangement of an intervention arrangement), the acts of the method according to the present embodiments are carried out. Herein, also, a possible embodiment of program means for carrying out measures carried out by the control arrangement of course also continues to apply.

DETAILED DESCRIPTION

Figure 1:
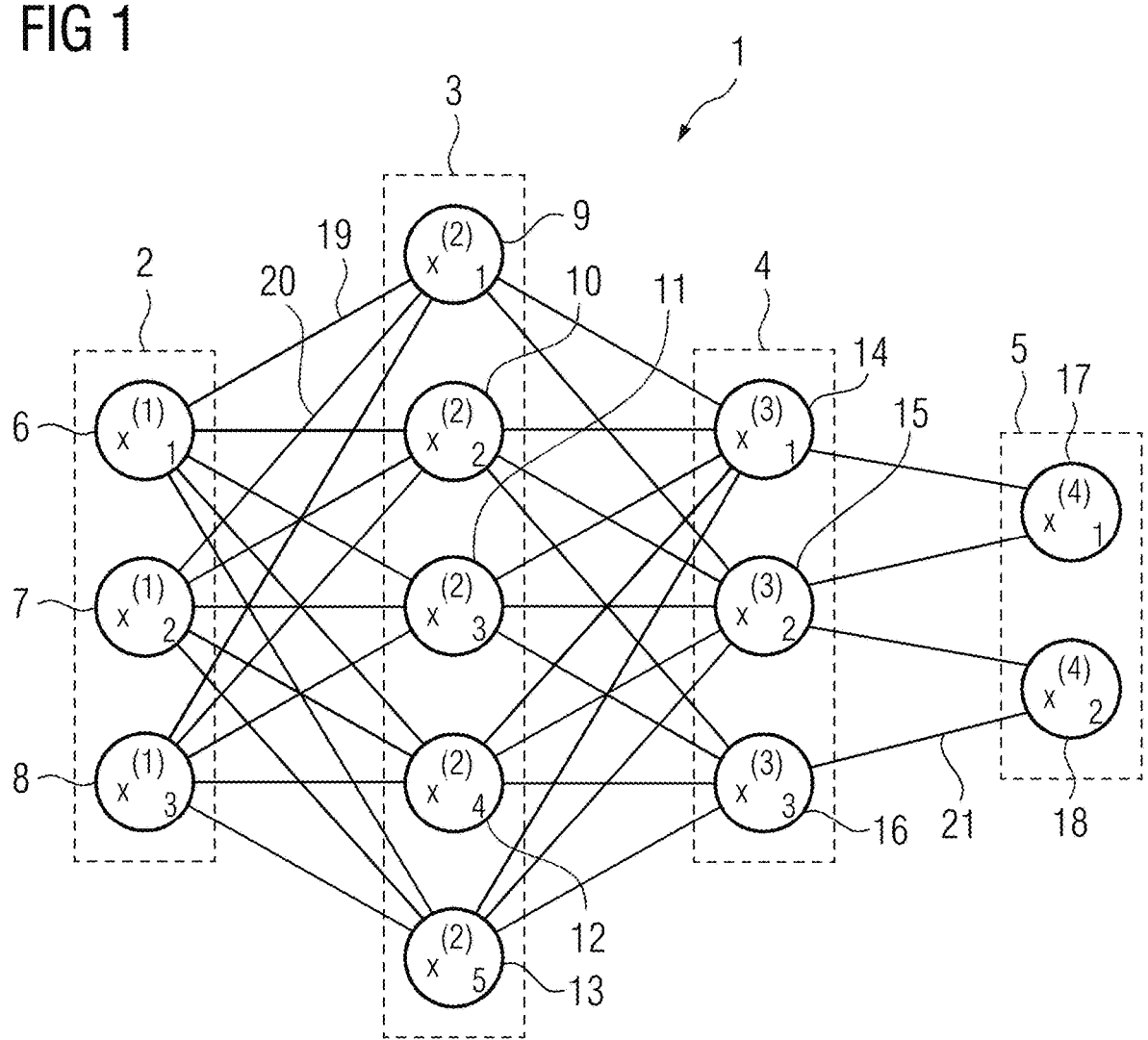
FIG. 1 shows an embodiment of a neural network.

FIG. 1 shows an exemplary embodiment of an artificial neural network 1. Other expressions for the artificial neural network 1 are "neural network", "artificial neural net", or "neural net".

The artificial neural network 1 includes nodes 6 to 18 and edges 19 to 21, where each edge 19 to 21 is a directed connection from a first node 6 to 18 to a second node 6 to 18. In general, the first node 6 to 18 and the second node 6 to 18 are different nodes 6 to 18, but in other embodiments, the first node 6 to 18 and the second node 6 to 18 may be identical. For example, in FIG. 1, the edge 19 is a directed connection from the node 6 to the node 9, and the edge 21 is a directed connection from the node 16 to the node 18. An edge 19 to 21 from the first node 6 to 18 to a second node 6 to 18 is designated an "ingoing edge" for the second node 6 to 18 and as an "outgoing edge" for the first node 6 to 18.

In this exemplary embodiment, the nodes 6 to 18 of the artificial neural network 1 may be arranged in layers 2 to 5, where the layers 2 to 5 may have an intrinsic order that is introduced by the edges 19 to 21 between the nodes 6 to 18. For example, the edges 19 to 21 may only be provided between adjacent layers of nodes 6 to 18. In the exemplary embodiment shown, there exists an input layer 2 that has only the nodes 6, 7, 8, in each case without an ingoing edge. The output layer 5 includes only the nodes 17, 18 each without outgoing edges, where further hidden layers 3 and 4 lie between the input layer 2 and the output layer 5. In the general case, the number of hidden layers 3, 4 may be selected arbitrarily. The number of nodes 6, 7, 8 of the input layer 2 typically corresponds to the number of input values into the neural network 1, and the number of the nodes 17, 18 in the output layer 5 typically corresponds to the number of the output values of the neural network 1.

For example, a number (e.g., real number) may be allocated to the nodes 6 to 18 of the neural network 1. Therein, $x^{(n)}_i$ denotes the value of the i-th node 6 to 18 of the n-th layer 2 to 5. The values of the nodes 6, 7, 8 of the input layer 2 are equivalent to the input values of the neural network 1, while the values of the nodes 17, 18 of the output layer 5 are equivalent to the output values of the neural network 1. Further, each edge 19, 20, 21 may be allocated a weight in the form of a real number. For example, the weight is a real number in the interval $[-1, 1]$ or in the interval $[0, 1]$. Therein, $w^{(m,n)}_{i,j}$ denotes the weight of the edge between the i-th nodes 6 to 18 of the m-th layer 2 to 5 and the j-th nodes 6 to 18 of the n-th layer 2 to 5. Further, the abbreviation $w_{i,j}^{(n)}$ is defined for the weight $w_{i,j}^{(n,n+1)}$.

In order to calculate output values of the neural network 1, the input values are propagated by the neural network 1. For example, the values of the nodes 6 to 18 of the (n+1)-th layer 2 to 5 may be calculated based on the values of the nodes 6 to 18 of the n-th layer 2 to 5 with $$x_j^{(n+1)} = f(\Sigma_i x_i^{(n)} \cdot w_{i,j}^{(n)}).$$

Therein, f is a transfer function that may be designated the activation function. Known transfer functions are step functions, sigmoid functions (e.g., the logistic function, the generalized logistic function, the hyperbolic tangent, the arctangent, the error function, the smoothstep function) or rectifiers. The transfer function is substantially used for normalizing purposes.

For example, the values are propagated layerwise by way of the neural network 1, where values of the input layer 2 are given by way of the input data of the neural network 1. Values of the first hidden layer 3 may be calculated based on the values of the input layer 2 of the neural network 1, and values of the second hidden layer 4 may be calculated based on the values in the first hidden layer 3, etc.

In order to be able to specify the values $w_{i,j}^{(n)}$ for the edges 19 to 21, the neural network 1 is to be trained using training data. For example, training data includes training input data and training output data that are denoted below as ti. For a training act, the neural network 1 is applied to the training input data in order to establish calculated output data. For example, the training output data and the calculated output data include a number of values, where the number is determined as the number of the nodes 17, 18 of the output layer 5.

For example, a comparison between the calculated output data and the training output data is used to adapt recursively the weights within the neural network 1 (e.g., "back-propagation algorithm"). For example, the weights may be amended according to $$w'_{i,j}^{(n)} = w_{i,j}^{(n)} - \gamma \cdot \delta_j^{(n)} \cdot x_i^{(n)},$$

where $\gamma$ is a learning rate, and the numbers $\delta_j^{(n)}$ may be calculated recursively according to $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $\delta_j^{(n+1)}$ when the (n+1)-th layer is not the output layer 5, and $$\delta_j^{(n)} = \left(x_k^{(n+1)} - t_i^{(n+1)}\right) \cdot f'\left(\sum_i x_i^{(n)} \cdot w_{i,j}^{(n)}\right)$$

if the (n+1)-th layer is the output layer 5. f' is the first derivative of the activation function, and, $y_j^{(n+1)}$ is the comparative training value for the j-th nodes 17, 18 of the output layer 5.

Figure 2:
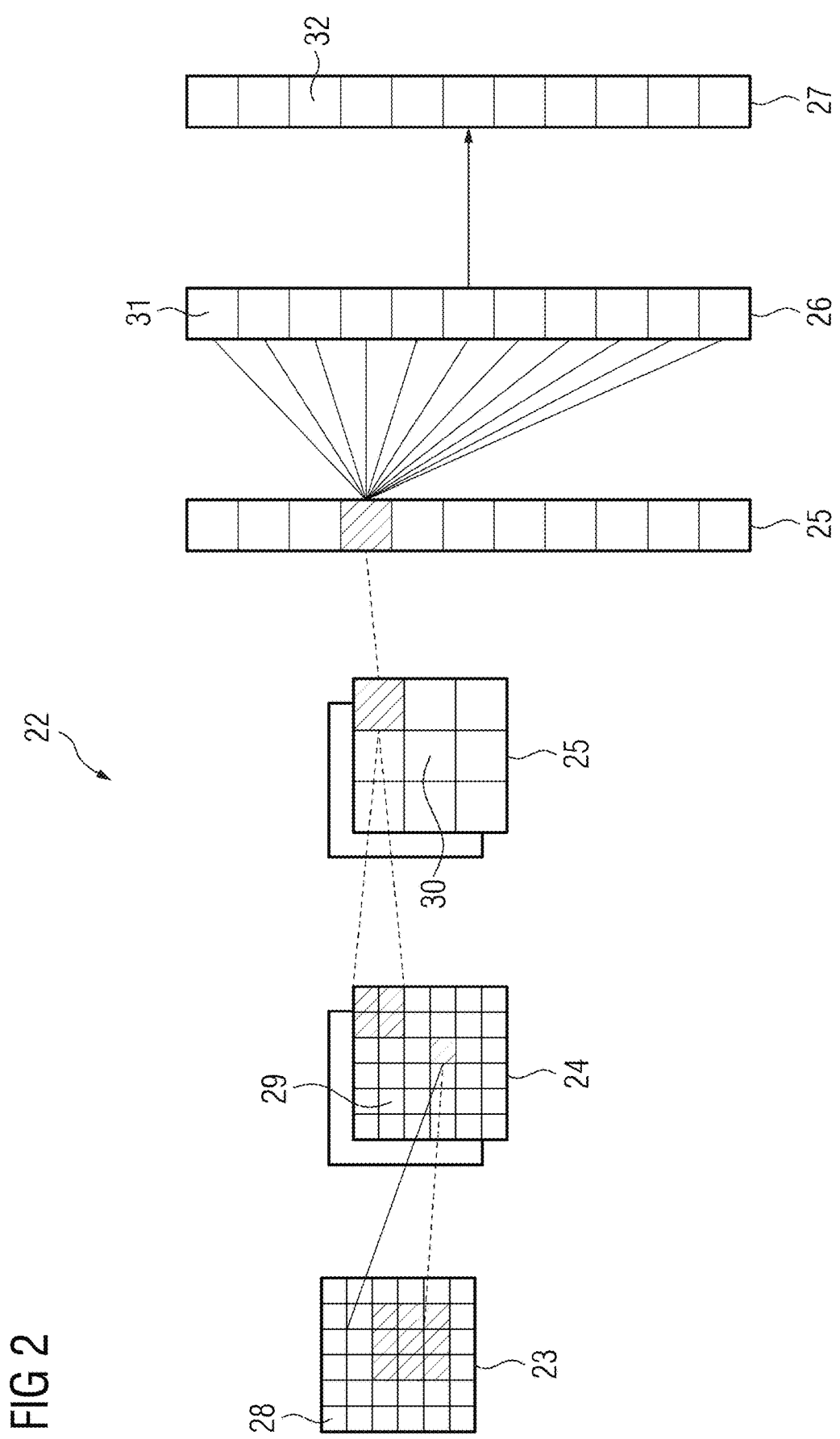
FIG. 2 shows an embodiment of a convolutional neural network (CNN)

An example will now also be given for a convolutional neural network (CNN), making reference to FIG. 2. The expression "layer" is used therein in a slightly different way than for classic neural networks. For a classic neural network, the expression "layer" merely indicates the set of nodes that form a layer and therefore a particular generation of nodes. For a convolutional neural network, the expression "layer" is often used as an object that actively changes data (e.g., as a set of nodes of the same generation and either the set of ingoing or of outgoing edges).

FIG. 2 shows an exemplary embodiment of a convolutional neural network 22. In the exemplary embodiment shown, the convolutional neural network 22 includes an input layer 23, a convolutional layer 24, a pooling layer 25, a completely connected layer 26, and an output layer 27. In alternative embodiments, the convolutional neural network 22 may contain a plurality of convolutional layers 24, a plurality of pooling layers 25, and a plurality of completely connected layers 26, exactly like other types of layers. The sequence of the layers may be selected as desired, where typically, completely connected layers 26 form the last layers before the output layer 27.

For example, within a convolutional neural network 22, the nodes 28 to 32 of one of the layers 23 to 27 may be arranged in a d-dimensional matrix or as a d-dimensional image. For example, in the two-dimensional case, the value of a node 28 to 32 may be denoted with the indices i,j in the n-th layer 23 to 27 as $x^{(n)}[i,j]$. The arrangement of the nodes 28 to 31 of a layer 23 to 27 has no effect on the calculations within the convolutional neural network 22 as such since these effects are produced entirely by the structure and the weights of the edges.

A convolutional layer 24 is distinguished, for example, in that the structure and the weights of the ingoing edges form a convolution operation based on a particular number of kernels. For example, the structure and the weights of the ingoing edges may be selected such that the values $x_k^{(n)}$ of the nodes 29 of the convolutional layer 24 are established as a convolution $x_k^{(n)} = K_k *_x x^{(n-1)}$ based on the values $x^{(n-1)}$ of the nodes 28 of the preceding layer 23, where the convolution * in the two-dimensional case may be defined as $$x_k^{(n)}[i,j] = (K_k * x^{(n-1)})[i,j] = \Sigma_{i'}\Sigma_{j'} K_k[i,j] \cdot x^{(n-1)}[i-i',j-j'].$$

Therein, the k-th kernel $K_k$ is a d-dimensional matrix (e.g., in this exemplary embodiment, a two-dimensional matrix) that is typically small in comparison with the number of the nodes 28 to 32 (e.g., a 3×3 matrix or a 5×5 matrix). For example, this implies that the weights of the ingoing edges are not independent, but rather are selected such that the weights generate the above convolution equation. In the example for a kernel that forms a 3×3 matrix, there exist only nine independent weights (e.g., where each entry of the kernel matrix represents an independent weight), regardless of the number of nodes 28 to 32 in the corresponding layer 23 to 27. For example, for a convolutional layer 24, the number of nodes 29 in the convolutional layer 24 is equivalent to the number of nodes 28 in the preceding layer 23 multiplied by the number of convolution kernels.

If the nodes 28 of the preceding layer 23 are arranged as a d-dimensional matrix, the use of the plurality of kernels may be understood as adding a further dimension that is also designated the depth dimension, so that the nodes 29 of the convolutional layer 24 are arranged as a (d+1)-dimensional matrix. If the nodes 28 of the preceding layer 23 are already arranged as a (d+1)-dimensional matrix with a depth dimension, the use of a plurality of convolution kernels may be understood as an expansion along the depth dimension, so that the nodes 29 of the convolutional layer 24 are likewise arranged as a (d+1)-dimensional matrix, where the size of the (d+1)-dimensional matrix in the depth dimension is larger by the factor formed by the number of the kernels than in the preceding layer 23.

The advantage of the use of convolutional layers 24 is that the spatially local correlation of the input data may be utilized in that a local connecting pattern is created between nodes of adjacent layers (e.g., in that each node has connections only to a small region of the nodes of the preceding layer).

In the exemplary embodiment shown, the input layer 23 includes thirty six nodes 28 that are arranged as a two-dimensional 6×6 matrix. The convolutional layer 24 includes seventy two nodes 29 that are arranged as two two-dimensional 6×6 matrices, where each of the two matrices is the result of a convolution of the values of the input layer 23 with a convolution kernel. In the same way, the nodes 29 of the convolutional layer 24 may be arranged in a three-dimensional 6×6×2 matrix, where the last-mentioned dimension is the depth dimension.

A pooling layer 25 is distinguished in that the structure and the weights of the ingoing edges and the activation function of its nodes 30 define a pooling operation on the basis of a non-linear pooling function f. For example, in the two-dimensional case, the values $x^{(n)}$ of the nodes 30 of the pooling layer 25 may be calculated based on the values $x^{(n+1)}$ of the nodes 29 of the preceding layer 24 as $$x^{(n)}[i,j]=f(x^{(n-1)}[id_1,jd_2], \ldots, x^{(n-1)}[id_1+d_1-1, jd_2+d_2-1]).$$

In other words, by way of the use of a pooling layer 25, the number of nodes 29, 30 may be reduced in that a number $d_1 \times d_2$ of adjacent nodes 29 in the preceding layer 24 are replaced by a single node 30 that is calculated as a function of the values of the number of adjacent nodes 29 For example, the pooling function f may be a maximum function, an averaging, or the L2 norm. For example, for a pooling layer 25, the weights of the ingoing edges may be specified and not modified by training.

The advantage of the use of a pooling layer 25 is that the number of nodes 29, 30 and the number of parameters is reduced. This leads to a reduction of the necessary calculation quantity within the convolutional neural network 22 and thus to a controlling of the overfitting.

In the exemplary embodiment shown, the pooling layer 25 is a max-pooling layer in which four adjacent nodes are replaced with just one single node, the value of which is formed by the maximum of the values of the four adjacent nodes. The max-pooling is applied to each d-dimensional matrix of the preceding layer; in this exemplary embodiment, the max-pooling is applied to each of the two two-dimensional matrices so that the number of the nodes is reduced from seventy two to eighteen.

A completely connected layer 26 is distinguished in that a plurality of (e.g., all) the edges between the nodes 30 of the preceding layer 25 and the nodes 31 of the completely connected layer 26 are present, where the weight of each of the edges may be individually adapted. In this exemplary embodiment, the nodes 30 of the preceding layer 25 and the completely connected layer 26 are shown both as two-dimensional matrices and also as non-coherent nodes (shown as one row of nodes, where the number of the nodes has been reduced for better clarity). In this exemplary embodiment, the number of the nodes 31 in the completely connected layer 26 is equal to the number of the nodes 30 in the preceding layer 25. In alternative embodiments, the number of the nodes 30, 31 may be different.

Further, in this exemplary embodiment, the values of the nodes 32 of the output layer 27 are determined in that the Softmax function is applied to the values of the nodes 31 of the preceding layer 26. By way of the application of the Softmax function, the sum of the values of all the nodes 32 of the output layer 27 is one, and all the values of all the nodes 32 of the output layer are real numbers between 0 and 1. If the convolutional neural network 22 is used for classifying input data, for example, the values of the output layer 27 can be interpreted as a probability that the input data falls into one of the different classes.

A convolutional neural network 22 may likewise have a ReLU layer, where ReLU is an acronym for "rectified linear units". For example, the number of the nodes and the structure of the nodes within a ReLU layer is equivalent to the number of the nodes and the structures of the nodes of the preceding layer. The value of each node in the ReLU layer may be calculated, for example, by applying a rectifier function to the value of the corresponding node of the preceding layer. Examples for the rectifier functions are $f(x)=\max(0,x)$, the hyperbolic tangent, or the sigmoid function.

Convolutional neural networks 22 may be trained, for example, based on the back-propagation algorithm. In order to prevent an overfitting, regularization methods may be used, for example (e.g., dropout of individual nodes 28 to 32, stochastic pooling, use of synthetic data, weight decay on the basis of the L1 or L2 norm, or maximal norm restrictions).

Figure 3:
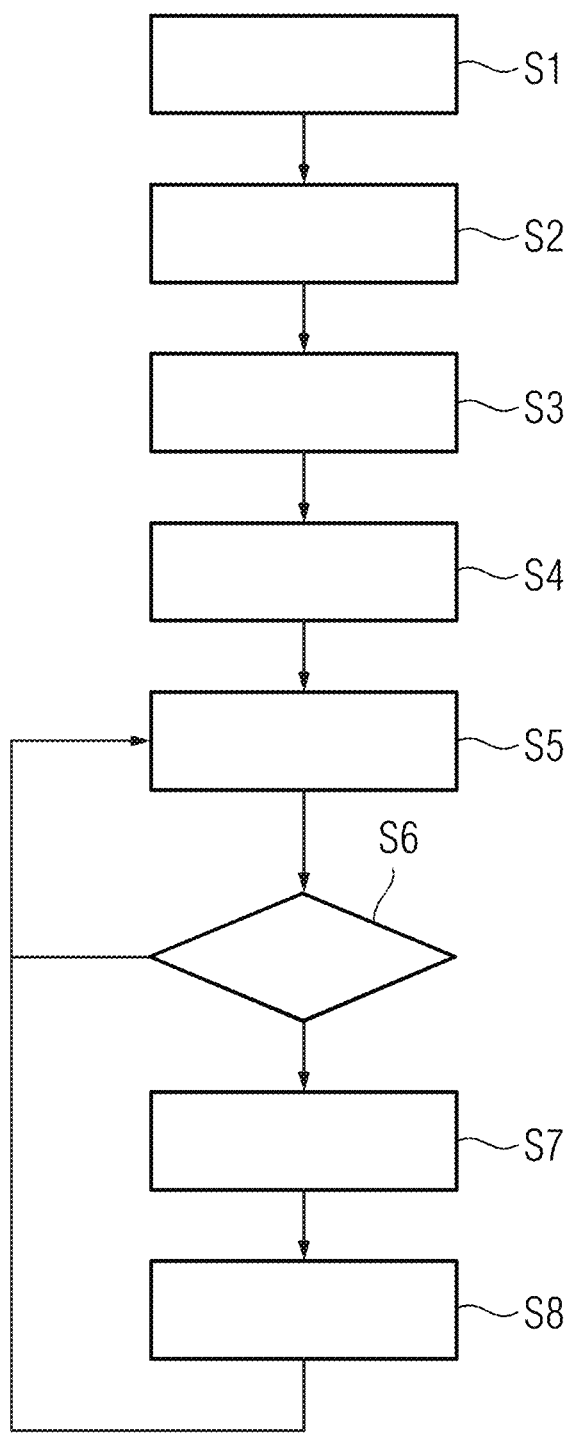
FIG. 3 shows a flow diagram of an embodiment of a method.

FIG. 3 shows a sequence plan of an exemplary embodiment of a method for planning and monitoring an intervention for embolization of a target region to be treated in a vascular system portion of a patient, where the vascular system portion includes, for example, the target region and, in relation to the target region, afferent and efferent blood vessels. The method shown includes an evaluation method for image data according to the present embodiments. In the specific example herein, an arteriovenous malformation (AVM) is considered as the target region to be treated, where a similar procedure for the embolization of the blood vessels supplying a tumor results. In the latter case, embolizing agents having a further effect may also be utilized (e.g., for irradiating the tumor). As the embolizing agent, in this exemplary embodiment, microspheres that are present in different diameters and therefore different sizes are to be provided.

In act S1, a three-dimensional time-resolved image data set of the vascular system portion is provided. In general, this may be a preoperative image data set such as a computed tomography image data set, a magnetic resonance image data set, a PET image data set, and/or an ultrasonic image data set. In the present exemplary embodiment, however, at least one of the at least one three-dimensional time-resolved image data set is provided as a four-dimensional DSA image data set (e.g., digital subtraction angiography), which is recorded, for example, with an interventional X-ray facility as close as possible in time before the planned execution of the intervention.

In act S2, using an analysis algorithm, the at least one three-dimensional time-resolved image data set that, in the example of the 4D-DSA, contains blood flow information based on the contrast medium bolus, for deriving a basic information item that would herein be suitable for a simulation, is evaluated. The basic information item therein includes structural parameters that define the geometry of the vascular system portion (e.g., as a segmentation result in the form of an adapted mesh). Structural parameters may define the size, the course and, if needed, also the wall of blood vessels and the target region. The basic information item further includes dynamic parameters that define the hemodynamics in the vascular system portion (e.g., blood flow velocities and suchlike). In addition, as part of the basic information item, further, for example, hemodynamic properties of the target region may be defined (e.g., a porosity and/or a permeability). For example, dynamic parameters may also be observed spatially resolved (e.g., as a blood flow velocity distribution). The basic information item in its totality may be understood a patient-specific patient surrogate model.

In addition to the basic information item, for carrying out act S3, an embolization information item that defines a plurality of embolizing agents that are to be used is also provided (e.g., microspheres of different diameters that are available). The embolization information item may also define further boundary conditions (e.g., the number of embolization instruments, such as microcatheters, that are available and/or may be introduced simultaneously). The embolization information item defines the equipment that may be used for the embolization intervention.

The embolization information item and the basic information item are used in act S3 as input information of an establishing algorithm in order to establish an actuation information item for an intervention facility used in the intervention. The intervention facility therein includes, in the present case, a positioning facility for robotically positioning the embolization instruments, and an embolizing agent output apparatus into which plug-in modules (e.g., cartridges and/or syringes for the embolizing agents of different diameters) may be introduced. The plug-in modules may be connected to at least one of the embolization instruments. Via an actuator, an extremely precise delivery of quantities and also mixtures of embolizing agents, controlled by a control facility of the intervention facility (e.g., via at least one mixing chamber to the embolization instruments and thus an administration into the vascular system portion) may take place. The positioning facility is also controllable by the control facility of the intervention facility.

Against this background, in the present case, the actuation information item that is established in act S3 defines a temporal sequence of instrument positions at which the outlet openings of the embolization instruments (e.g., microcatheters) are to be arranged, and a corresponding administration of compositions of embolizing agents (e.g., microspheres of different diameters from these instrument positions which can also change over time). The compositions may also include at least one mixture. Therefore, the actuation information item contains all the control parameters necessary for a control unit of the control facility of the intervention facility, in order to actuate the positioning facility and the embolizing agent output apparatus during the intervention and/or for carrying out said intervention. Embodiments in which the actuation information item also includes an intervention path for the instruments to the corresponding instrument positions via the vascular system, which may also take place with robot support by the positioning facility and, as will also be shown, may be fluoroscopically monitored are provided.

In the present case, the established actuation information item further includes a prediction information item that defines an expected embolization effect based on the composition, the instrument positions, and the temporal sequence that, in the present case, corresponds to an information item already arising in act S3.

In order to determine the actuation information item that corresponds to an embolization configuration with instrument positions, compositions of embolizing agents, and the temporal sequence, in act S3 in the context of the establishing algorithm, an optimization method is used. The optimization method uses a subalgorithm that, applied to a test configuration (e.g., with instrument positions, compositions of embolizing agents, and a temporal sequence) in conjunction with the basic information item, outputs an effect information item that defines the embolization effect of the test configuration. For this purpose, the subalgorithm may include a simulation but uses a trained function in the present exemplary embodiment.

Figure 4:
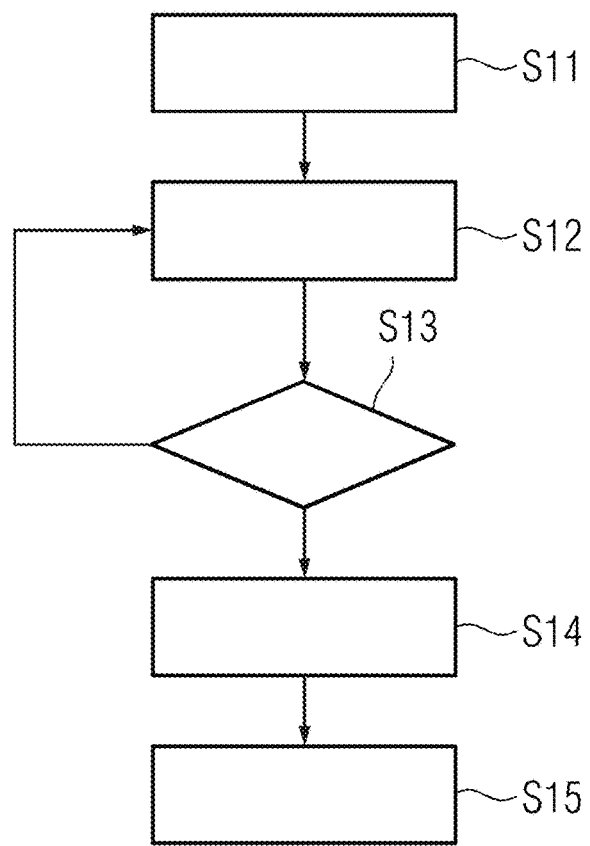
FIG. 4 shows a flow diagram of a possible training method for a trained function.
Figure 5:
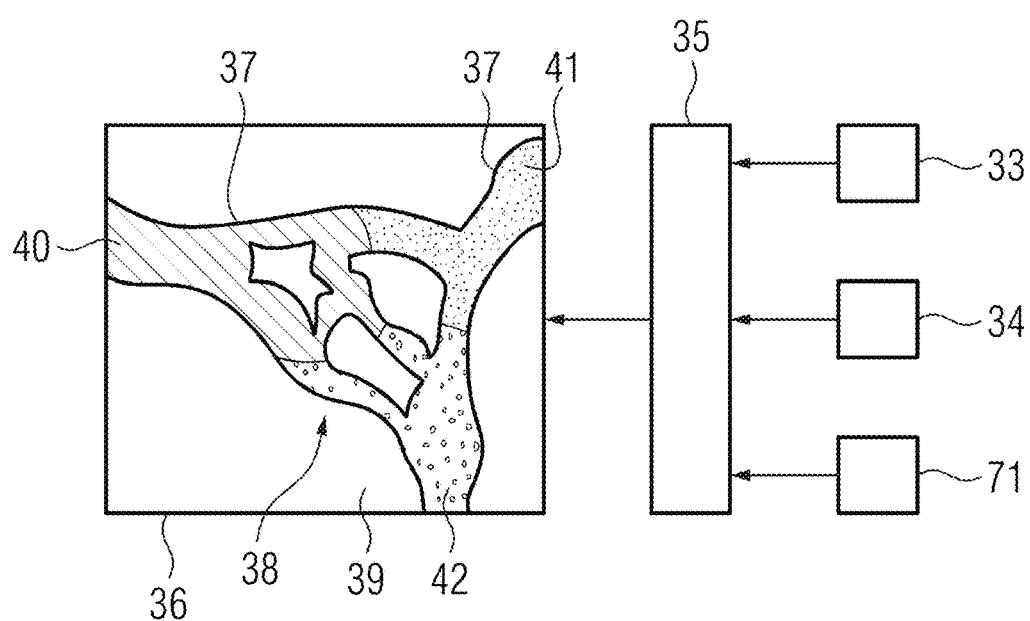
FIG. 5 shows a sketch for the carrying out of simulations.
Figure 6:
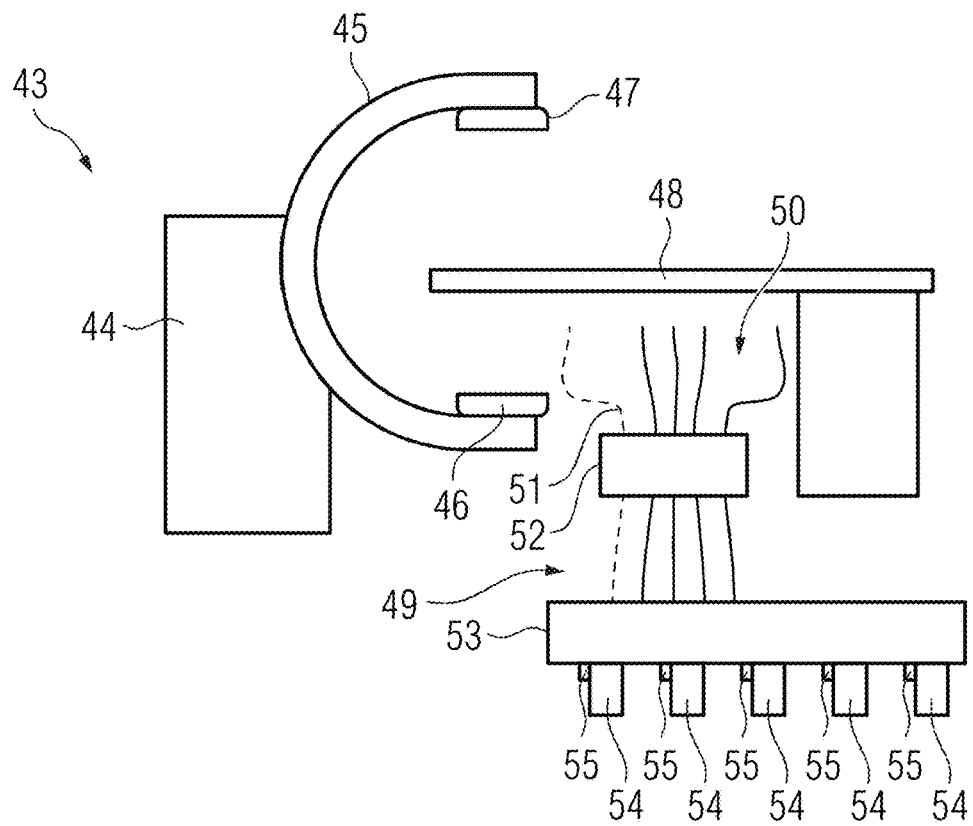
FIG. 6 shows an intervention arrangement according to an embodiment.

The training of the trained function of the establishing algorithm is explained in greater detail by way of the sequence plan in FIG. 4 and FIG. 5. The training takes place based on a simulation. Therein, in act S11, combinations of basic information item and training configurations (e.g., with instrument positions, compositions of embolizing agents, and a temporal sequence) are provided as training input data of the trained function. In one embodiment, for example, actually recorded 4D-DSA image data sets may be used and analyzed (e.g., by the analysis algorithm) in order to obtain the basic information item; "invented" and/or otherwise generated basic information item may also be used. The basic information item may again be a patient surrogate model of the vascular system portion, so that the geometry and the hemodynamics that are needed as the basis of the simulation that follows in act S12 is described. Training configurations may be generated, for example, based on specifications or actually occurring interventions. A plurality of training configurations for a single basic configuration may be provided.

In act S12, for each set of training input data, a simulation is carried out (e.g., based on the use of microspheres to be understood as the particles, a CF-PD simulation in order to establish training output data and therefore an effect information item). The effect information item includes, in the present case, a time-resolved distribution of embolizing agents in the vascular system portion and a three-dimensional (e.g., also time-resolved) pressure distribution in the vascular system portion. Such a system is indicated schematically in FIG. 5.

It is recognizable initially that the basic information item 33 and the training configuration item 34 supply input data for the simulation 35 that is also parameterized via a physics information item 71 (e.g., physics model) that describes the underlying physics. For example, a phase model may be combined with a mixing theory and a concept of volume components in order to obtain a multiphase macromodel in the sense of the multiphase mixing continuum mechanics modeling. Modifications may be undertaken based on the particle nature of embolizing agents or a physical basis, and simulation technology that relates to particle-fluid interactions in a predetermined geometry is called upon directly.

On the left side of FIG. 5, by way of example, an effect situation described by the simulation 35 in the vascular system portion 36 at a particular time point is indicated. As shown, blood vessels 37 and the target region 38 to be treated, thus the target area, are delimited according to the structural parameters of the basic information item by parenchyma 39. Shaded regions 40 therein correspond to normal blood, and dotted regions 41, 42 indicate portions occupied by different embolizing agents. Otherwise, regions already blocked to flow by embolizing agents may also be considered as part of the parenchyma 39, so that the simulation indeed relates to the permeable portions of the vascular system portion 36. For example, with regard to the temporal sequence, where, for example, a plurality of temporal simulation portions may be used, this is relevant in order to be able to assess the embolization success. From the effect information item at the end of the simulation, it may be deduced whether the portions of the vascular system portion 36 to be occluded have actually been embolized or whether throughflow (e.g., blood throughflow) still occurs there. Accordingly, it may also be suitable if the effect information item also includes a spatial blood flow velocity distribution.

Returning to FIG. 4, in act S13, it is checked whether further training input data sets exist. If so, progress continues with the next set of training input data in order in act S12 to carry out the simulation 35 and to obtain training output data in the form of the effect information item, and therefore, to form a further training data set. If all the training input data sets have been processed, progress to a next act S14 takes place where, using the thus obtained training data sets, a training process of a function of the artificial intelligence (e.g., a CNN that is formed by an encoder and a decoder) is carried out in order to obtain the trained function and to be able to provide the trained function in act S15.

The trained function thus acts like the simulation, but may be carried out far quicker (e.g., in real time), which is particularly important in an application for monitoring, as will be explained below. Nevertheless, if the simulation 35 may be carried out quickly enough, the simulation 35 may also be used, in place of the trained function, as part of the subalgorithm in act S3. Fundamentally, however, exemplary embodiments may be provided in which neither a simulation nor a trained function is used and in act S3 (e.g., a lookup table or suchlike is used), although this is less preferable.

Referring back to FIG. 3, therefore, in the optimization method for test configurations by the subalgorithm including the trained function, effect information items are established, based on which an optimum is found for the effect information item. Therein, different optimization criteria may be used, apart from the most complete possible embolization of the target area (e.g., also the shortest possible time for the intervention, the smallest possible quantity of embolizing agents, and/or the smallest possible risk to the patient). In this regard, it is at least provided in the present exemplary embodiment with regard to the minimization of the risk to the patient, also to provide boundary conditions of the optimization method (e.g., in the form of a maximum pressure value that should not be exceeded in order to keep a hemorrhage and rupture risk as low as possible). This is possible since a pressure distribution is also obtained as effect information.

The optimal test configuration may be regarded as an embolization configuration that is ultimately to be used. The optimal test configuration is output in the form of the actuation information item that, as previously suggested, also includes, as the prediction information item, the effect information item of the embolization information item, which ultimately contains the expected embolization effect for all the substeps, compositions of embolizing agents, and instrument positions.

In act S4, the actuation information item is provided (e.g., to the control facility of the intervention facility). The control facility of the intervention facility may, for example, use the actuation information item for actuating the intervention facility (e.g., for actuating the positioning facility and/or the embolizing agent output apparatus).

The following acts S5 to S8 take place during the execution of the embolization intervention. In act S5, two-dimensional fluoroscopy images of the vascular system portion are regularly recorded, for example, at a particular recording rate by the interventional X-ray facility, which was configured in a manner that is known in principle for a particular, suitable projection geometry. The use of fluoroscopy images for intervention monitoring therein takes place during the preparation (e.g., along the intervention path to the instrument positions) in order to track this path through the vascular system, as is known in principle and possibly to output indications and/or to adapt the actuation of the positioning facility. The fluoroscopy monitoring may also relate to preparatory measures (e.g., the output of medications and suchlike).

However, during the use of the actuation information item for administering embolizing agents according to the embolization configuration, a recording and evaluation of two-dimensional fluoroscopy images, for example, also for correcting the instrument positions and suchlike, which need not be described in detail here since it is known at least in principle for intervention monitoring, are provided. In embodiments, when embolizing agents that are visible in the X-ray imaging are used as a type of "contrast layering", a temporal sequence of contrast medium administration (e.g., for evaluating the throughflow in the target region) and embolizing agent administration may take place (e.g., such that no or only little contrast medium is present in the vascular system portion when embolizing agent is administered). This enables the blood flow and the embolizing agent distribution to be assessed separately, as will be set out in more detail below. In addition, contrast media may be output by a plug-in module in the embolizing agent output apparatus via the embolization instruments, which also applies for other active agents (e.g., medications). In one embodiment, other instruments (e.g., preparation catheters) may be attached to the embolizing agent output apparatus, and the embolizing agent output apparatus may be used for the output of contrast medium (or other active agents).

In act S6, in the context of the monitoring, the embolization effect that is visible in the fluoroscopy images is compared with the embolization effect described by the prediction information item. Since the prediction information item is based upon a simulation and/or upon a trained function replacing the simulation, from the prediction information item, it is also known in a time-resolved manner how, for example, the embolizing agent should be distributed and what occluding effect it should have. This may be derived at least basically from the fluoroscopy images, where for this purpose, a blood flow information item (e.g., from a time series of fluoroscopy images with contrast medium) may be established. If a deviation that meets an updating criterion occurs (e.g., exceeds a threshold value), in act S5, the recording of the next fluoroscopy image is not continued, but an updating of the actuation information item and therefore an adaptation to the altered situation in real time is aimed for.

For this purpose, in act S7, the fluoroscopy images are initially used to adapt the basic information item as the basis of the use of the simulation and/or trained function and therefore to update the patient-specific patient surrogate model. Therein, it may be taken into account, for example, that a partial occlusion has taken place and/or altered blood flow velocities have arisen.

Based on this changed basic information item, in act S8 (e.g., using the establishing algorithm), an updated actuation information item is established and is used for actuating the intervention facility. For example, when using a trained function, the updated actuation information item may be realized in a real-time capable manner, so that it is possible to react rapidly to any events arising that justify a deviation from the originally planned procedure.

In one embodiment, for otherwise established planning information/actuation information items, a real time monitoring of this type may be carried out via fluoroscopy images and an adaptation (e.g., using the trained function), so that effectively when an unexpected event or another deviation from the embolization plan occurs, it is possible to react immediately and dynamically with regard to the composition of embolizing agents, the instrument positions, and the temporal sequence. This is an advantage of the intervention arrangement according to the present embodiments described in greater detail below.

FIG. 5 shows a sketch of the principle of an exemplary embodiment of such an intervention arrangement 43 according to the present embodiments. The intervention arrangement 43 includes an interventional X-ray facility 44 having a C-arm 45 on which an X-ray radiator 46 and an X-ray detector 47 are arranged opposite one another. For example, the C-arm 45 may be pivotable about a patient table and/or operating table 48. The intervention arrangement 43 further includes an intervention facility 49 that includes the embolization instruments 50 merely indicated herein (e.g., microcatheters) that may be introduced into the vascular system of a patient to be treated. Optionally, the intervention facility 49 may also include further medical instruments (e.g., preparation catheters 51 that are indicated dashed here).

The instruments 50, 51 may be positioned at least partially robotically by a positioning facility 52. The instruments 50, 51 are also connected to an embolizing agent output apparatus 53 that has a plug-in module system for plug-in modules 54 (e.g., cartridges) with different types of embolizing agents (e.g., microspheres of different diameters) in order to feed the corresponding embolizing agents to attached embolization instruments 50 (e.g., via at least one mixing chamber (not shown)). In order to be able to do this with a high degree of accuracy, an actuator 55 of a high-precision actuator system is allocated to each plug-in module 54, where, where mixing chambers are used, corresponding actuators allocated thereto may also be provided.

Both the X-ray facility 44 and also the intervention facility 49 have control facilities that form part of a control arrangement 56 of the intervention arrangement 43. Via the control facility of the intervention facility 49, the actuation information item that describes the embolization configuration may be implemented with outstanding accuracy with regard to the composition of embolizing agents, the instrument positions, and the temporal sequence.

Figure 7:
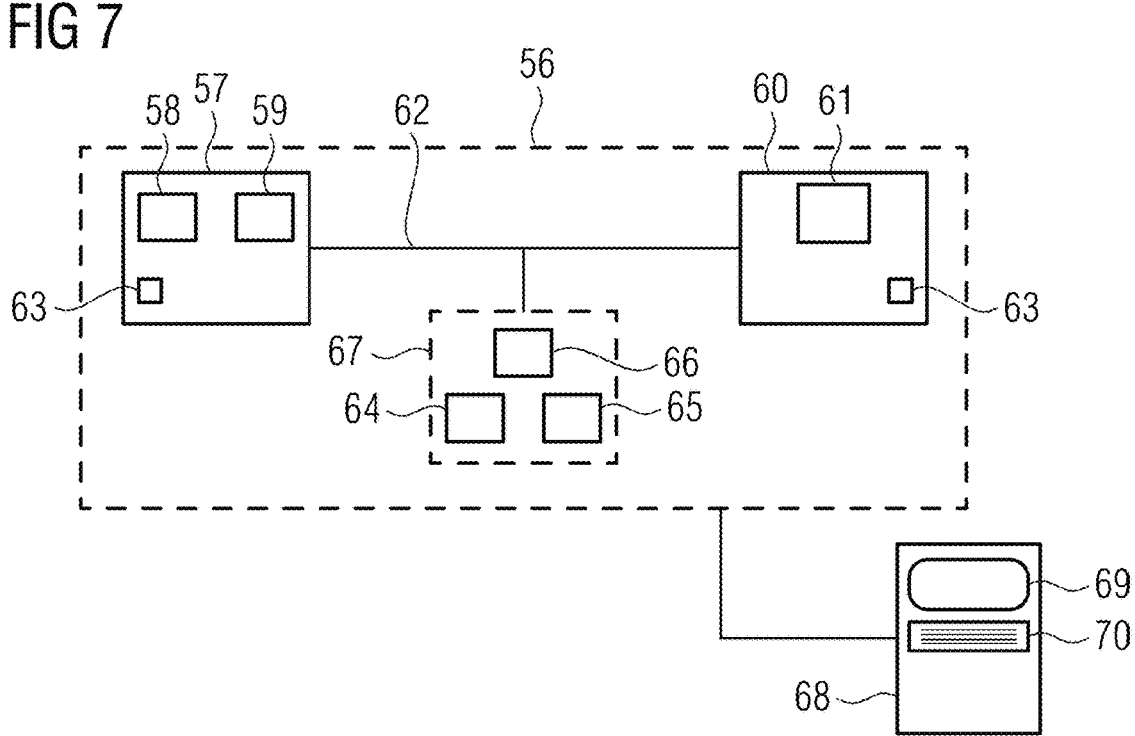
FIG. 7 shows the functional structure of a control arrangement of the intervention arrangement.

FIG. 7 shows the functional structure of the control arrangement 56 of the intervention arrangement 43 in greater detail. As mentioned above, the control arrangement 56 has a control facility 57 of the X-ray facility 44 that, in the present case, has, as is generally known, a recording unit 58 for controlling the recording of image data and a reconstruction unit 59 for reconstructing three-dimensional image data sets from two-dimensional projection images. Using these functional units 58, 59, if the X-ray facility 44 is to record and provide one or more of the at least one three-dimensional time-resolved image data set, the control facility 57 may therefore at least partially carry out act S1. Using the recording unit 58, the recording of fluoroscopy images may also be brought about in act S5.

The control arrangement 56 further includes the control facility 60 of the intervention facility 49, which in the present case, has a control unit 61 for actuating, for example, the positioning facility 52 and the embolizing agent output apparatus 53 (e.g., according to the actuation information item in act S4 and/or using the actuation information item updated in act S8). Both control facilities 57, 60 are connected by a communication connection 62 and may also have a storage device 63. The control arrangement 56 further includes an analysis unit 64 for carrying out the analysis algorithm, therefore for establishing the basic information item and an establishing unit 65 for carrying out the establishing algorithm, and therefore for establishing the actuation information item (acts S2 and S3). Further, a monitoring unit 66 is also not only available for position monitoring of embolization instruments 50 and/or also further instruments 51, but also for monitoring the embolization effect according to acts S6 to S8, where with regard to act S8, as described, the establishing unit 65 may also be used.

The function units 64, 65 and 66 may be located in one of the two control facilities 57, 60. However, it is also possible optionally to provide a further (e.g., here shown dashed) computing facility or control facility 67 that may then be connected via the communication link 62 to the control facilities 57 and 60.

By way of the communication link 62 and the use of the monitoring unit 66, a type of closed control loop is provided, since the fluoroscopy monitoring may have direct effects on the control of the intervention facility, in order thus to achieve an optimal embolization result.

The control arrangement 56 may also be connected to an operating facility 68 of the intervention arrangement 43, which includes a display facility 69 and an input facility 70. The operating facility 68 enables the operator to be constantly informed about the procedures (e.g., via output of the actuation information item, the fluoroscopy images, and suchlike). At the same time, the possibility of an intervention at any time exists (e.g., for adapting automatically obtained results and/or of their foundations and suchlike). In this way, the well-informed user always remains in command of the embolization intervention that may be carried out by the embolization arrangement 43.

Although the invention has been illustrated and described in detail by way of the embodiments, the invention is not restricted by the examples disclosed; other variations may be derived therefrom by a person skilled in the art without departing from the protective scope of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for evaluating image data of a patient showing a target region to be treated with at least one embolizing agent, in a vascular system portion of the patient, the computer-implemented method comprising:
providing at least one three-dimensional time-resolved image data set of the vascular system portion;
establishing at least one structural parameter that describes a geometry of at least the vascular system portion, a basic information item comprising dynamic parameters that describe hemodynamics in the vascular system portion, or the at least one structural parameter and the basic information item from the at least one three-dimensional time-resolved image data set by an analysis algorithm;

providing an embolization information item describing a plurality of embolizing agents that are to be used;

establishing an actuation information item describing at least one suitable composition of the plurality of embolizing agents, for an intervention facility used for carrying out a treatment by an establishing algorithm that uses the basic information item and the embolization information item; and providing the actuation information item to the intervention facility, facility;

providing at least one current fluoroscopy image of the vascular system portion;

evaluating the at least one current fluoroscopy image for an updating of the basic information item;

after the evaluating of the at least one current fluoroscopy image, establishing an updated actuation information item based on the updated basic information item;

establishing, in a prediction procedure using the establishing algorithm, as part of the actuation information item, or in the prediction procedure and as part of the actuation information item, a prediction information item describing an effect situation in the vascular system portion;

comparing the prediction information item with an actual effect situation described by the at least one current fluoroscopy image; and determining the updated actuation information item when a deviation information item meets an updating criterion, wherein the at least one suitable composition of the plurality of embolizing agents includes spheres having different diameters.

2. The method of claim 1, wherein the actuation information item is also established describing one instrument position of an outlet opening of at least one embolization instrument in the vascular system portion, a temporal sequence of administration of the embolizing agent via the at least one embolization instrument, or a combination thereof.

3. The method of claim 1, wherein the establishing algorithm comprises execution of a simulation of the hemodynamics based on the basic information item, the establishing algorithm comprises a function trained by training data derived from the simulation, or a combination thereof.

4. The method of claim 3, wherein the simulation is carried out as a computational fluid dynamics simulation, in the case of microspheres as the embolizing agent, as a computational fluid-particle dynamics simulation, or a combination thereof.

5. The method of claim 3, wherein the establishing of the actuation information item comprises an optimization method relating to at least the at least one suitable composition, and wherein a subalgorithm comprising the simulation, the trained function, or the subalgorithm and the trained function establish an effect information item to be optimized that describes the embolization effect using a test configuration of the actuation information item.

6. The method of claim 5, wherein the effect information item comprising a pressure distribution is established in the vascular system portion, and wherein a predetermined maximum pressure as a boundary condition in the optimization method is not be exceeded.

7. An intervention arrangement for carrying out an embolization intervention with at least one embolizing agent in a target region in a vascular system portion of a patient, the intervention arrangement comprising:

an interventional X-ray facility;

an intervention facility comprising:
    embolization instruments that are positionable in the vascular system portion; and
    an embolizing agent output apparatus that is connectable to the embolization instruments for outputting at least one embolizing agent via the connected embolization instruments; and a control arrangement comprising:
    a first control facility, the first control facility being of the X-ray facility; and
    a second control facility, the second control facility being of the intervention facility, wherein the first control facility and the second control facility are connected via a communication link, wherein the control arrangement is configured to:
    evaluate image data of a patient showing a target region to be treated with at least one embolizing agent, in a vascular system portion of the patient, the evaluation of the image data comprising:
        provision of at least one three-dimensional time-resolved image data set of the vascular system portion;
        establishment of at least one structural parameter that describes a geometry of at least the vascular system portion, a basic information item comprising dynamic parameters that describe hemodynamics in the vascular system portion, or the at least one structural parameter and the basic information item from the at least one three-dimensional time-resolved image data set by an analysis algorithm;
        provision of an embolization information item describing a plurality of embolizing agents that are to be used;
        establishment of an actuation information item describing at least one suitable composition of the plurality of embolizing agents, for an intervention facility used for carrying out a treatment by an establishing algorithm that uses the basic information item and the embolization information item;
        provision of the actuation information item to the intervention facility;
        provision of at least one current fluoroscopy image of the vascular system portion;
        evaluation of the at least one current fluoroscopy image for an update of the basic information item;
        after the evaluation of the at least one current fluoroscopy image, establishment of an updated actuation information item based on the updated basic information item;
        establishment, in a prediction procedure using the establishing algorithm, as part of the actuation information item, or in the prediction procedure and as part of the actuation information item, a prediction information item describing an effect situation in the vascular system portion;
        comparison of the prediction information item with an actual effect situation described by the at least one current fluoroscopy image; and determination of the updated actuation information item when a deviation information item meets an updating criterion; and actuate the intervention facility according to the actuation information item, wherein the at least one suitable composition of the plurality of embolizing agents includes spheres having different diameters.

8. The intervention arrangement of claim 7, wherein the embolizing agent output apparatus has:

an accuracy in the output of embolizing agent of less than 1 ml;

a plug-in module system for a plurality of plug-in modules that each include an embolizing agent, at least one further intervention instrument, or the embolizing agent and the at least one further intervention instrument; or a combination thereof.

9. The intervention arrangement of claim 7, wherein the intervention facility further comprises:

a robotic positioning facility for positioning the embolization instruments that are to be used, wherein given an actuation information item comprising additionally at least one instrument position of an outlet opening of at least one embolization instrument in the vascular system portion, the control facility of the intervention facility is configured for actuating the positioning facility for positioning at least one of the embolization instruments in the at least one instrument position.

10. The intervention arrangement of claim 7, wherein the control arrangement is further configured to:

actuate the X-ray facility for recording two-dimensional fluoroscopy images of the vascular system portion; and evaluate the fluoroscopy images for monitoring the positioning of at least one embolization instrument, the embolization effect, or a combination thereof.

11. The intervention arrangement of claim 10, wherein the control arrangement is further configured, given a deviation from a planning information item comprising the actuation information item, to actuate the intervention facility for at least partially automatic, at least partial correction of the deviation.

12. The intervention arrangement of claim 10, wherein the control arrangement is further configured to, for the monitoring, use at least one patient-related additional information item of at least one measuring facility of the intervention arrangement.

13. The intervention arrangement of claim 12, wherein the at least one measuring facility includes a flow sensor, an imaging sensor, or the flow sensor and the imaging sensor.

14. The intervention arrangement of claim 13, wherein the imaging sensor includes an OCT facility, an IVUS facility on at least one embolization instrument that is used, or a combination thereof.

15. The intervention arrangement of claim 9, wherein the intervention facility or the X-ray facility also includes a contrast medium administration facility, wherein the control arrangement for actuating the contrast medium administration facility dependent upon an embolizing agent feed by the intervention facility is configured such that on administration of an X-ray visible embolizing agent, a reduced or no contrast medium quantity is present in the vascular system portion.

16. In a non-transitory computer-readable storage medium that stores instructions executable by one or more processors to evaluate image data of a patient showing a target region to be treated with at least one embolizing agent, in a vascular system portion of the patient, the instructions comprising:

providing at least one three-dimensional time-resolved image data set of the vascular system portion;

establishing at least one structural parameter that describes a geometry of at least the vascular system portion, a basic information item comprising dynamic parameters that describe hemodynamics in the vascular system portion, or the at least one structural parameter and the basic information item from the at least one three-dimensional time-resolved image data set by an analysis algorithm;

providing an embolization information item describing a plurality of embolizing agents that are to be used;

establishing an actuation information item describing at least one suitable composition of the plurality of embolizing agents, for an intervention facility used for carrying out a treatment by an establishing algorithm that uses the basic information item and the embolization information item; and providing the actuation information item to the intervention facility, facility;

providing at least one current fluoroscopy image of the vascular system portion;

evaluating the at least one current fluoroscopy image for an updating of the basic information item;

after the evaluating of the at least one current fluoroscopy image, establishing an updated actuation information item based on the updated basic information item;

establishing, in a prediction procedure using the establishing algorithm, as part of the actuation information item, or in the prediction procedure and as part of the actuation information item, a prediction information item describing an effect situation in the vascular system portion;

comparing the prediction information item with an actual effect situation described by the at least one current fluoroscopy image; and determining the updated actuation information item when a deviation information item meets an updating criterion, wherein the at least one suitable composition of the plurality of embolizing agents includes spheres having different diameters.

\* \* \* \* \*